United States Patent [19]

Fukuda et al.

[11] Patent Number: 5,303,058
[45] Date of Patent: Apr. 12, 1994

[54] DATA PROCESSING APPARATUS FOR COMPRESSING AND RECONSTRUCTING IMAGE DATA

[75] Inventors: Masahiro Fukuda; Tsugio Noda, both of Isehara, Japan

[73] Assignee: Fujitsu Limited, Kanagawa, Japan

[21] Appl. No.: 779,274

[22] Filed: Oct. 18, 1991

[30] Foreign Application Priority Data

Oct. 22, 1990 [JP] Japan .................. 2-284049
Oct. 30, 1990 [JP] Japan .................. 2-294146

[51] Int. Cl.⁵ ...................... H04N 1/415; H04N 1/417
[52] U.S. Cl. .................. 358/261.1; 358/261.2; 358/261.3; 358/430; 358/433
[58] Field of Search ............ 358/432, 433, 261.1, 358/133, 261.2, 261.3; 382/56; 341/63, 67

[56] References Cited

U.S. PATENT DOCUMENTS 5,184,229 2/1993 Saito et al. .................. 358/432

Primary Examiner—Edward L. Coles, Sr.
Assistant Examiner—Scott A. Rogers
Attorney, Agent, or Firm—Staas & Halsey

[57] ABSTRACT

An image data processing apparatus for fast coding and reconstructing continuous-tone image data, parallelly processes DCT coefficients in pipelined quantization and dequantization. An image data compressing apparatus comprises an orthogonally transformer for obtaining a transform coefficient matrix by two-dimensionally orthogonally transforming continuous-tone image data, a quantizer for quantizing respective elements of a coefficient matrix, a signal producer for outputting the serial quantized coefficients by attaching a termination signal to the tail end, and a coder for outputting codes corresponding to significant coefficients. An image data reconstructing apparatus comprises a decoder for decoding input codes to the coefficient codes and succession length codes, a coefficient code reverter for reverting the coefficient codes into significant coefficients, a succession length code reverter for reverting the succession length codes into insignificant coefficient succession length, a memory for storing a data pair of a significant coefficient and an insignificant coefficient succession length, a dequantizer for obtaining appropriate transform coefficients by dequantizing significant coefficients in data pairs, and an inverse orthogonally transformer for two-dimensionally inverse-orthogonally transforming the transform coefficient matrix and for outputting the transforming result as image data.

10 Claims, 20 Drawing Sheets

FIG. 2
PRIOR ART

| 10 | 15 | 13 | 14 | 14 | 14 | 14 | 14 |
|----|----|----|----|----|----|----|----|
| 13 | 16 | 19 | 18 | 20 | 24 | 22 | 22 |
| 13 | 15 | 16 | 20 | 18 | 21 | 22 | 22 |
| 14 | 14 | 17 | 21 | 21 | 22 | 23 | 19 |
| 14 | 16 | 17 | 21 | 21 | 22 | 24 | 23 |
| 14 | 15 | 22 | 22 | 22 | 25 | 26 | 24 |
| 15 | 17 | 25 | 29 | 29 | 46 | 33 | 35 |
| 27 | 34 | 39 | 43 | 50 | 62 | 45 | 54 |

FIG. 3
PRIOR ART

| 91 | -17 | -6 | 1 | -2 | 0 | 3 | -2 |
|----|-----|----|----|----|----|----|----|
| -28 | 8 | 3 | -2 | 1 | 1 | -4 | 2 |
| 14 | -3 | -1 | 1 | -1 | -3 | 3 | -1 |
| -14 | 4 | 1 | -1 | 0 | 1 | -1 | 2 |
| 9 | 1 | 0 | 1 | 2 | -3 | -2 | 0 |
| -6 | 0 | -1 | 1 | 0 | 1 | 0 | 0 |
| 0 | 2 | 1 | -1 | 1 | 0 | -1 | 0 |
| -1 | 0 | 0 | 0 | 0 | 0 | 0 | -1 |

FIG. 4
PRIOR ART

| 16 | 11 | 10 | 16 | 24 | 40 | 51 | 61 |
|----|----|----|----|----|----|----|----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

FIG. 5
PRIOR ART

| 5 | -2 | 0 | 0 | 0 | 0 | 0 | 0 |
|----|----|---|---|---|---|---|---|
| -3 | 1 | 0 | 0 | 0 | 0 | 0 | 0 |
| 1 | 0 | 0 | 0 | 0 | 0 | 0 | 0 |
| -1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 6
PRIOR ART

| 1 | 2 | 6 | 7 | 15 | 16 | 28 | 29 |
|---|---|---|---|----|----|----|----|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

FIG. 8
PRIOR ART

| 5 | -2 | 0 | 0 | 0 | 0 | 0 | 0 |
|---|----|---|---|---|---|---|---|
| -3 | 1 | 0 | 0 | 0 | 0 | 0 | 0 |
| 1 | 0 | 0 | 0 | 0 | 0 | 0 | 0 |
| -1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | a |

FIG. 7 (a)
*PRIOR ART*

| C1 | C2 | C3 | C4 | C5 | C6 | EOB |
|----|----|----|----|----|----|-----|

FIG. 7 (b)
*PRIOR ART*

| C1 | C2 | C3 | C4 | ... | Ce |
|----|----|----|----|-----|-----|

FIG. 10
PRIOR ART

| 80  | -22 | 0 | 0 | 0 | 0 | 0 | 0 |
|-----|-----|---|---|---|---|---|---|
| -36 | 12  | 0 | 0 | 0 | 0 | 0 | 0 |
| 14  | 0   | 0 | 0 | 0 | 0 | 0 | 0 |
| -14 | 0   | 0 | 0 | 0 | 0 | 0 | 0 |
| 0   | 0   | 0 | 0 | 0 | 0 | 0 | 0 |
| 0   | 0   | 0 | 0 | 0 | 0 | 0 | 0 |
| 0   | 0   | 0 | 0 | 0 | 0 | 0 | 0 |
| 0   | 0   | 0 | 0 | 0 | 0 | 0 | 0 |

FIG. 15

| ADDRESS | N MOST SIGNIFICANT BITS | M LEAST SIGNIFICANT BITS |
|---|---|---|
| | INDEX | RUN |
| 1 | D | |
| 2 | 11 | R1 |
| 3 | 12 | R2 |
| ... | ... | ... |
| n | | Reob |

FIG. 16

| ADDRESS | 1 | 2 | 3 | ... | |
|---|---|---|---|---|---|
| INDEX | 5 | -2 | -3 | ... | |
| RUN | | 0 | 0 | ... | REOB |

FIG. 20 (a)

| D | R1 I1 | R2 I2 | R3 I3 | R4 I4 | R5 I5 | Reob1 |

FIG. 20 (b)

| D | R1 I1 | R2 I2 | R3 I3 | ... | Re Ie | Reob2 |

DATA PROCESSING APPARATUS FOR COMPRESSING AND RECONSTRUCTING IMAGE DATA

BACKGROUND OF THE INVENTION

1. Field of the Invention

This invention relates to an image data compressing apparatus for compressing image data by an adaptive discrete cosine transform coding system used for compressing a continuous-tone image such as a grayscale image or a color image, and to an image data reconstructing apparatus for reconstructing image data from codes obtained by the adaptive discrete cosine transform system.

2. Description of the Related Art

An adaptive discrete cosine transform coding system (hereafter referred to as an ADCT system) utilizing a two-dimensional orthogonal transform is widely used as a coding system for compressing a volume of data without damaging the integrity of a continuous-tone image such as a grayscale image or a color image.

An ADCT system splits a continuous-tone image into blocks each comprising a predetermined number of picture elements (e.g. 8×8 picture elements), obtains a matrix composed of transform coefficients (hereafter referred to as DCT coefficients) by orthogonally transforming the image data in block units, and coding in variable lengths respective elements of the matrix quantized by using the corresponding visually adaptive thresholds (described later), thereby compressing a volume of data.

FIG. 1 is a block diagram of an image data compressing apparatus using a conventional ADCT system. FIG. 2 shows an example of a block split from a continuous-tone image.

A DCT unit 11 performs a two-dimensional discrete cosine transform (hereafter abbreviated as DCT) for an inputted block and transforms it into a matrix of DCT coefficients corresponding to respective space frequency distributions having eight (8) rows and eight (8) columns (hereafter referred to as a DCT coefficient D). FIG. 3 shows an example of the DCT coefficient matrix D.

A linear quantizer 21 quantizes respective elements of the DCT coefficient matrix D. Visually adaptive thresholds are pre-determined as a result of an experiment on visual sensitivity for respective space frequency elements. The linear quantizer 21 stores a quantization matrix $V_{TH}$ made up of such visually adaptive thresholds, quantizes the DCT coefficient matrix D by using a quantization threshold matrix $Q_{TH}$ obtained through a multiplication between respective elements of the quantization matrix $V_{TH}$ and an appropriate parameter, and calculates quantized coefficient matrix $D_{QU}$.

Since human vision is, generally, more sensitive to lower space frequencies and less sensitive to higher space frequencies, the absolute values of the elements in the quantization matrix $V_{TH}$ corresponding to lower space frequencies are smaller, whereas those corresponding to higher space frequencies are larger. Therefore, in most cases, only the DC element, which is in the first row and the first column of the quantized coefficient matrix $D_{QU}$, and a very few AC elements, which represent low space frequencies, are significant coefficients having non-zero values, while the majority of the AC elements are insignificant coefficients having the zero value, as shown in FIG. 5.

FIG. 6 illustrates a zig-zag scanning order. By scanning the quantized coefficient matrix $D_{QU}$ according to the scanning order called a zig-zag scan, the linear quantizer 21 rearranges the two-dimensionally arrayed elements of the quantized coefficient matrix $D_{QU}$ into one-dimensionally arrayed elements and inputs them sequentially to a coder 31. In this case, the coder 31 sequentially receives the elements of the quantized coefficient matrix $D_{QU}$ starting from the one corresponding to the DC element at the head end and then those corresponding to AC elements having lower space frequencies.

The coder 31 detects significant coefficients having non zero values from among the elements of the quantized coefficient matrix $D_{QU}$ and counts the number of insignificant coefficients, which are inputted in a series according to the above sequence, before detecting a significant coefficient, thereby converting the rearranged elements of the quantized coefficient matrix $D_{QU}$ into pairs each comprising a detected significant coefficient (hereafter referred to as an index) and such a counted value (hereafter referred to as a run).

By converting the elements of the quantized coefficient matrix $D_{QU}$ into runs and indices, the coder 31 reduces the volume of data necessary for expressing the quantized coefficient matrix $D_{QU}$.

Further, the coder 31 codes the indices and the runs ordinarily according to a draft specification for standardization (JPEG-8-R8) issued by the JPEG (Joint Photographic Experts Group). After obtaining both coded indices (hereafter referred to as index codes) and coded runs (hereafter referred to as run codes), the coder 31 outputs codes corresponding to pairs of index codes and run codes.

Here, the codes corresponding to the pairs of index codes and run codes are determined by the frequencies of the occurrences of the pairs. Shorter codes are assigned to the pairs occurring more frequently and longer codes are assigned to pairs occurring less frequently. Thus, the coder 31 further reduces the volume of data necessary for expressing runs and indices by converting the pairs of index codes and run codes into Huffman codes having code lengths commensurate with the occurrence frequencies.

Also the above described draft specification for standardization defines two format types for a case outputting a code indicating a block end and a case not outputting a code indicating a block end, depending on whether or not the last inputted element of the quantized coefficient matrix $D_{QU}$ is an insignificant coefficient.

When the last element read out by the zig-zag scan from the quantized coefficient matrix $D_{QU}$ such as shown in FIG. 5 is an insignificant coefficient, the coder 31 attaches an "EOB" code indicating that the subsequent quantized coefficients are all insignificant to the tail end of codes for a block, as shown in FIG. 7A. When the last element of the quantized coefficient matrix $D_{QU}$ is a significant coefficient having a non-zero value "a", as shown in FIG. 8, on the other hand, the coder 31 does not output the "EOB" code, as shown in FIG. 7B.

Thus, image data for a block are DCTed, quantized and coded.

By repeating the above described processes of a DCT, quantization and coding for all blocks of a picture, image data of the picture are compressed, and the compressed image data are stored e.g. in a disk apparatus or transmitted over a transmission path.

The image data reconstructing apparatus shown in FIG. 9 reconstructs image data from compressed data e.g. composed of the above described codes.

A decoder 41 decodes sequentially inputted codes into the pairs of index codes and run codes according to a decoding table, and sequentially restores the original indices and runs according to the above described draft specification for standardization.

A dequantizer 51 multiplies the indices by the corresponding elements of the quantization threshold matrix $Q_{TH}$, and outputs the products as the appropriate elements of the DCT coefficient matrix D according to the runs described above, thereby reconstructing the DCT coefficient matrix D as shown in FIG. 10. Inverse DCT unit 731 reconstructs image data in respective blocks by two-dimensionally inversely DCTing the corresponding dequantized DCT coefficient matrix D for each of the blocks.

Here, the conventional image data compressing apparatus described above has the linear quantizer 21 obtain the quantized coefficient matrix $D_{QU}$ for a block and the coder 31 sequentially code the corresponding pair of index and run upon detecting each significant coefficient among the elements of the quantized coefficient matrix $D_{QU}$. Since a processor or the like executes the quantization and the coding in a series, the time required for those processes has been long and image data cannot be compressed at a high speed.

Similarly, since a conventional image data reconstructing apparatus has a processor or the like execute the decoding and the dequantization in a series, the dequantization starts only after indices and runs are sequentially produced from index codes and run codes obtained by decoding codes. Therefore, the time required for those processes has been long and image data cannot be reconstructed from compressed data at a high speed.

On the other hand, although the processes can be expedited by having hardware simply replace the linear quantizer 21 and the coder 31, the circuit must necessarily be oversized. Hardware substituting for the coder 31 must have a complex circuit configuration, because the hardware needs to convert the rearranged elements of the quantized coefficient matrix $D_{QU}$ into pairs each comprising an index and a run, as well as to code the pairs, in synchronization with the rearrangement of the two-dimensionally arrayed elements of the quantized coefficient matrix $D_{QU}$ into one-dimensionally arrayed elements. Therefore, a cumbersome procedure is anticipated during a test.

Conventionally, DCT coefficients are individually read out and compressed in an image data compression through quantization, and DCT coefficients are individually reconstructed from compressed data in an image data reconstruction through dequantization.

SUMMARY OF THE INVENTION

This invention relates to an image data compressing apparatus for compressing the data volume of a continuous tone image through a coding and to an image data reconstructing apparatus for reconstructing continuous-tone image data from compressed data. This invention aims at compressing and reconstructing image data fast with a simple configuration or by a simple control.

This invention configures an image data compressing apparatus comprising: an orthogonally transforming means for obtaining a coefficient matrix comprising N rows and N columns of transform coefficients by two-dimensionally orthogonally transforming continuous-tone image data in block units each having N×N picture elements; a quantizing means for quantizing respective elements of a coefficient matrix obtained by the orthogonally transforming means by corresponding quantization thresholds and for outputting quantized coefficients, being the results of quantizing respective elements of the coefficient matrix, in a predetermined sequence; a signal producing means for converting a series of quantized coefficients outputted from the quantizing means into serial quantized coefficients comprising significant coefficients having non-zero values each paired with the corresponding one of insignificant coefficient succession lengths indicating the numbers of successive insignificant coefficients having the zero value, and for outputting serial quantized coefficients by attaching a termination signal to the tail end of the serial quantized coefficients; a coding means for outputting codes respectively corresponding to significant coefficients each paired with the corresponding one of insignificant coefficient succession lengths included in serial quantized coefficients outputted from the signal producing means.

BRIEF DESCRIPTION OF THE DRAWINGS

FIG. 2 (PRIOR ART) shows an example of a block split from a continuous-tone image;

FIG. 3 (PRIOR ART) shows an example of a DCT coefficient matrix D;

FIG. 4 (PRIOR ART) shows an example of a quantization matrix $V_{TH}$;

FIGS. 5 (PRIOR ART) and 8 (PRIOR ART) show examples of a quantized coefficient matrix $D_{QU}$;

FIG. 6 (PRIOR ART) illustrates a zig-zag scanning order;

FIGS. 7A (PRIOR ART) and 7B (PRIOR ART) show exemplary sets of codes for a block;

FIG. 10 (PRIOR ART) shows an example of a dequantized DCT coefficient matrix D;

FIG. 15 is an address table for explaining the storage position in a quantized coefficient memory;

FIGS. 16 reveals the content of a quantized coefficient memory obtained by quantizing respective elements of the DCT coefficient matrix D shown in FIG. 3;

FIGS. 20A and 20B show exemplary configurations of serial quantized coefficients;

DESCRIPTION OF THE PREFERRED EMBODIMENTS

Description of the Underlying Principles

First Embodiment

Figure 1:
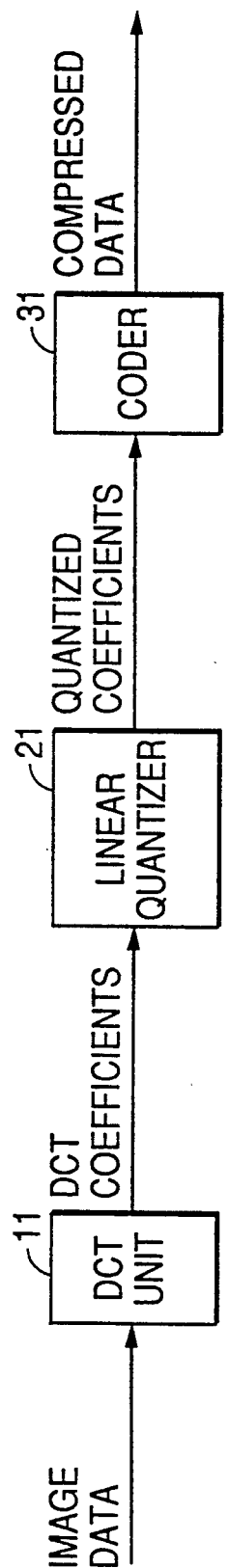
FIG. 1 (PRIOR ART) is a block diagram of an image data compressing apparatus using a conventional ADCT system.
Figure 9:
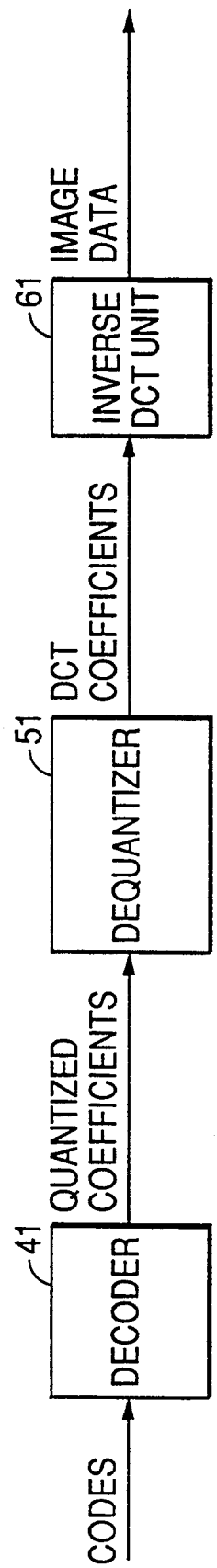
FIG. 9 (PRIOR ART) is a block diagram of an image data reconstructing apparatus using a conventional ADCT system.
Figure 11:
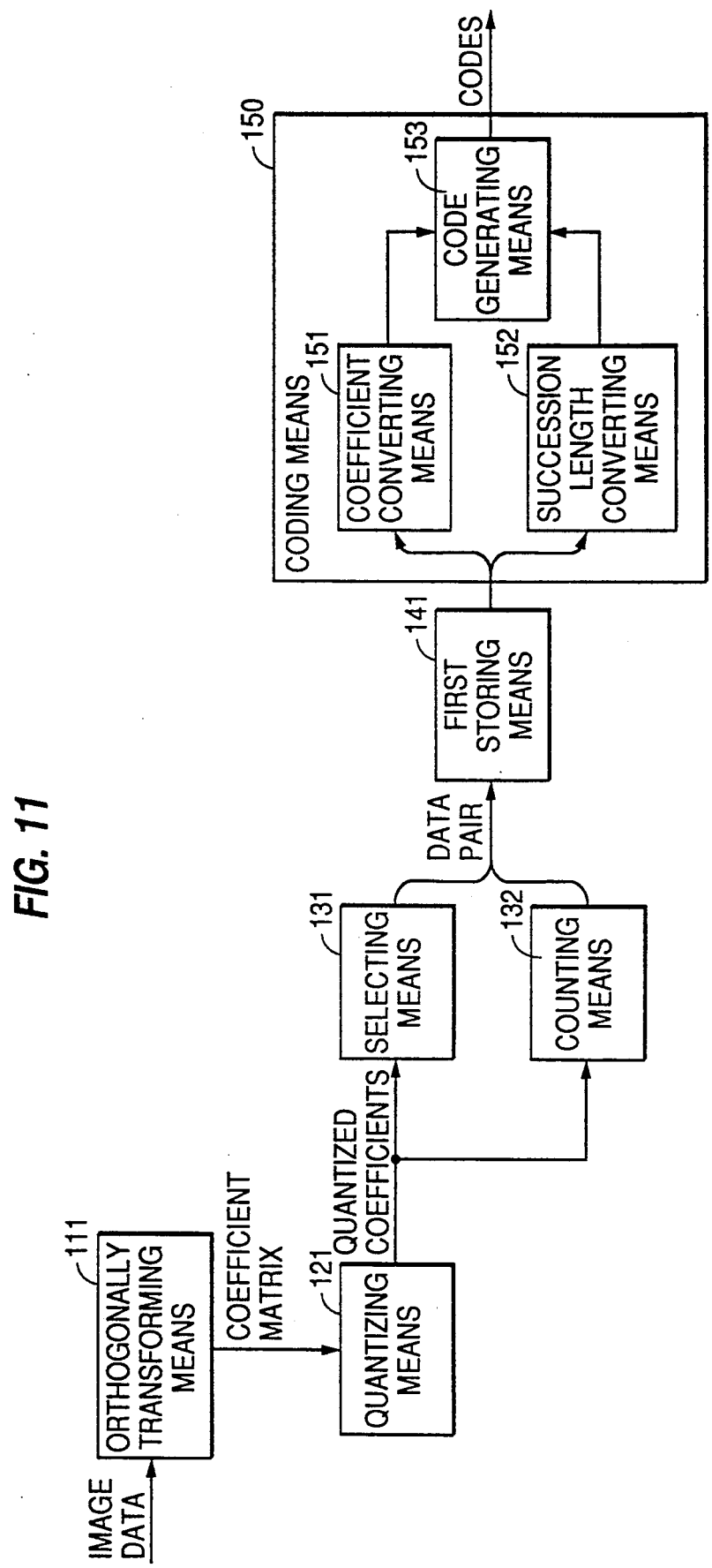
FIG. 11 is a block diagram of an image data compressing apparatus according to a first embodiment of this invention.

FIG. 11 is a block diagram of an image data compressing apparatus according to a first embodiment of this invention. An orthogonally transforming means 111 obtains a coefficient matrix comprising N rows and N columns of transform coefficients by two-dimensionally orthogonally transforming continuous-tone image data in block units each having N×N picture elements.

A quantizing means 121 quantizes respective elements of a coefficient matrix obtained by orthogonally transforming means 111 by corresponding quantization thresholds and outputs quantized coefficients, which are obtained as the results of quantizing respective elements of the coefficient matrix, in a predetermined sequence.

A selecting means 131 sequentially receives quantized coefficients obtained by quantizing means 121, selects significant coefficients having non-zero values from among the quantized coefficients, and sequentially outputs the significant coefficients.

A counting means 132 sequentially receives the quantized coefficients, counts the number of the successive inputs of insignificant coefficients having the zero value, and outputs counting results as insignificant coefficient succession lengths upon each receipt of the corresponding one of the significant coefficients.

Selecting means 131 operates in parallel with the counting means 132. A first storing means 141 sequentially stores data pairs, each comprising one of the significant coefficients obtained by selecting means 131 paired with the corresponding one of the insignificant coefficient succession lengths obtained by the counting means 132.

A coding means 150 outputs codes respectively corresponding to the data pairs read out from the first storing means 141, where each data pair comprises one of the significant coefficients paired with the corresponding one of the insignificant coefficient succession lengths.

Coding means 150 comprises: a coefficient converting means 151 for converting parts corresponding to significant coefficients of data pairs stored in the first storing means 141 into appropriate coefficient codes; a succession length converting means 152 for converting parts corresponding to insignificant coefficient succession lengths of the data pairs into appropriate succession length codes; and a code generating means 153 for generating a code corresponding to a pair comprising a coefficient code obtained by the coefficient converting means 151 and a succession length code obtained by the succession length converting means 152.

The first storing means 141 has a memory capacity for storing data pairs corresponding to two (2) blocks of the image data; and coding means 150 codes the already stored data pairs in parallel with operations for generating and storing data pairs by quantizing means 121, selecting means 131 and the counting means 132.

Quantizing means 121 outputs in a predetermined sequence, to selecting means 131 and the counting means 132, quantized coefficients corresponding to respective elements of a coefficient matrix obtained by orthogonally transforming means 111. Selecting means 131 and the counting means 132 convert the series of quantized coefficients to significant coefficients each paired with the corresponding one of insignificant coefficient succession lengths.

Since selecting means 131 operates independently of the counting means 132, the selection of significant coefficients is performed separately from the counting of insignificant coefficient succession lengths. Hence, the system operation is expedited by executing the processes independently rather than sequentially.

The significant coefficients and the insignificant coefficient succession lengths are paired and the data pairs are supplied to coding means 150 through the first storing means 141. Thus, the coding process is expedited, because it needs not be deferred until significant coefficients and insignificant coefficient succession lengths are sorted, unlike in the prior art.

Since selecting means 131 operates in parallel with the counting means 132, significant coefficients can be obtained concurrently with insignificant coefficient succession lengths, thereby shortening the time necessary for selecting significant coefficients and counting insignificant coefficient succession lengths.

The coefficient converting means 151 and the succession length converting means 152 convert the data pairs stored in the first storing means 141 to pairs of coefficient codes and succession length codes. The code generating means 153 converts these converted pairs into corresponding codes.

Since the coefficient converting means 151 and the succession length converting means 152 can operate independently of each other, their parallel operations enable both a significant coefficient and an insignificant coefficient succession length to be coded simultaneously, thereby expediting the coding process according to the draft specification for standardization.

The first storing means 141 having a storage capacity for two (2) blocks of data pairs connects the coefficient converting means 151 with selecting means 131 and the counting means 132. The coding by coding means 150 in parallel with the generation and storage of the data pairs expedites the quantization and coding of the coefficient matrix.

Second Embodiment

Figure 12:
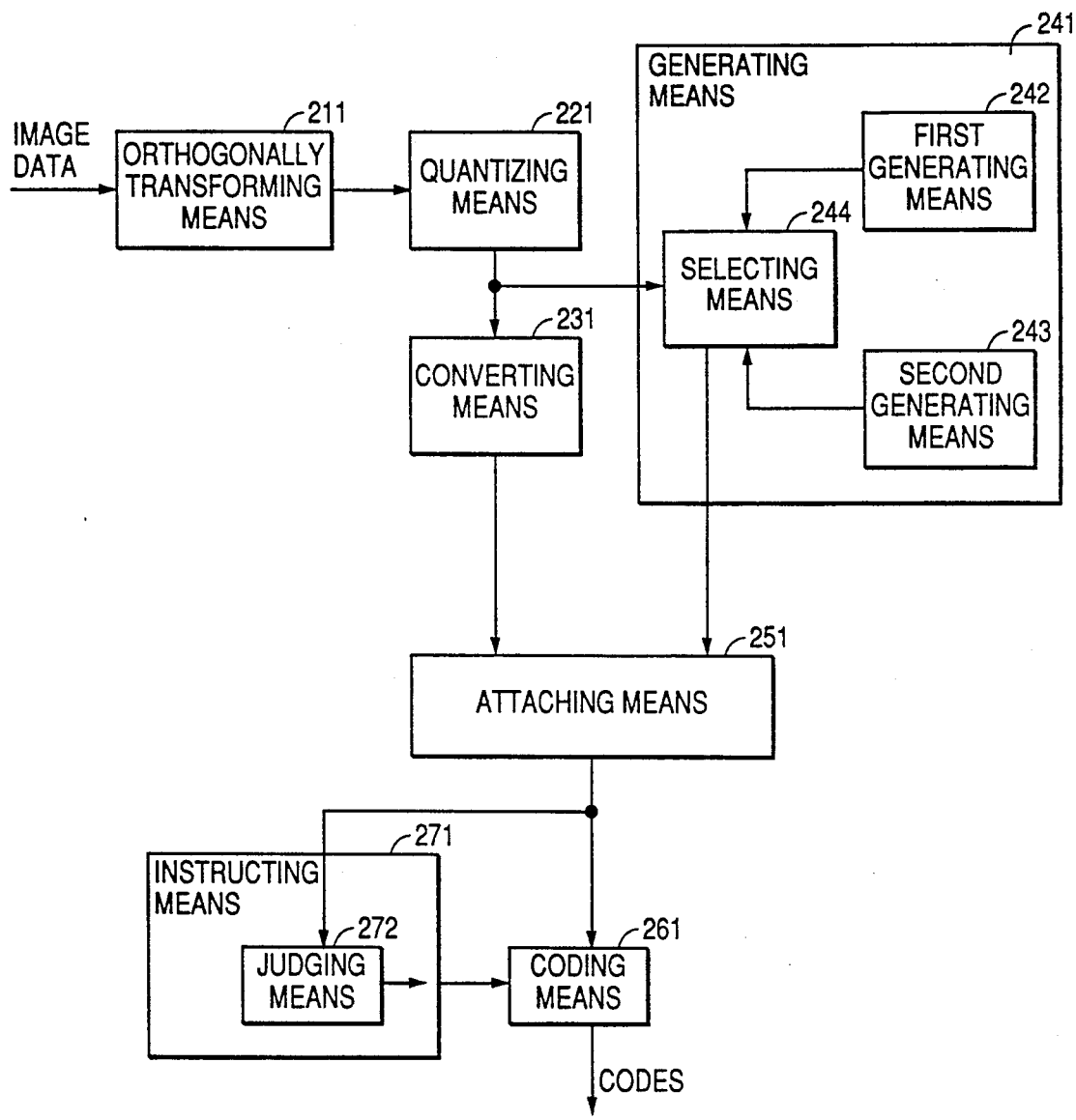
FIG. 12 is a block diagram of an image data compressing apparatus according to a second embodiment of this invention.

FIG. 12 is a block diagram of an image data compressing apparatus according to a second embodiment of this invention.

An orthogonally transforming means 211 obtains a coefficient matrix comprising N rows and N columns of transform coefficients by two-dimensionally orthogonally transforming continuous-tone image data in block units each having N×N picture elements.

A quantizing means 221 quantizes respective elements of a coefficient matrix obtained by orthogonally transforming means 211 by corresponding quantization thresholds and outputs quantized coefficients, which are obtained as the results of quantizing respective elements of the coefficient matrix, in a predetermined sequence.

A converting means 231 converts a series of quantized coefficients outputted from quantizing means 221 into serial quantized coefficients comprising significant coefficients having non-zero values each paired with the corresponding one of insignificant coefficient succession lengths indicating the numbers of successive insignificant coefficients having the zero value.

A generating means 241 generates a predetermined termination signal.

An attaching means 251 outputs serial quantized coefficients obtained by the converting means 231 by attaching a termination signal generated by the generating means 241 to the tail end of the serial quantized coefficients.

A coding means 261 outputs codes respectively corresponding to significant coefficients each paired with the corresponding one of insignificant coefficient succession lengths included in serial quantized coefficients outputted from the attaching means 251.

An instructing means 271 instructs coding means 261 of a termination of a process for coding a block upon detecting the termination signal during a receipt of the serial quantized coefficients.

The generating means 241 comprises a first generating means 242 for generating a predetermined first termination signal, a second generating means 243 for generating a different second termination signal, and a selecting means 244 for selectively outputting, as a termination signal, either the first termination signal or the second termination signal, depending on whether or not a quantized coefficient outputted last from quantizing means 221 is an insignificant coefficient.

The instructing means 271 comprises a judging means 272 for judging whether the termination signal is a first termination signal or a second termination signal, and instructs coding means 261 of a termination of coding for a block according to the judging result of the judging means 272.

Quantizing means 221, the converting means 231 and the attaching means 251 perform the following processes in block units. Quantizing means 221 quantizes, in a predetermined sequence, respective elements of a coefficient matrix obtained by orthogonally transforming means 211. The converting means 231 creates serial quantized coefficients comprising significant coefficients each paired with the corresponding one of insignificant coefficient succession lengths. The attaching means 251 attaches a termination signal generated by the generating means 241 to the tail end of the serial quantized coefficients.

The instructing means 271 instructs coding means 261 of a termination of a process for coding a block upon detecting the termination signal during a receipt of the serial quantized coefficients.

As is evident, the process for creating serial quantized coefficients and the process for coding the serial quantized coefficients are finite for each block. Therefore, independent circuits realize these processes. This enables simple circuits to configure a quantization processor and a coding processor. Also, since such circuits can operate independently, they expedite the processes which have been sequentially performed conventionally by a processor.

Selecting means 244 selectively outputs, as a termination signal, either the first termination signal or the second termination signal, depending on whether or not a quantized coefficient outputted last from quantizing means 221 is an insignificant coefficient. Therefore, the instructing means 271 can judge whether or not the last quantized coefficient is an insignificant coefficient according to the judging result of the judging means 272, which enables the instructing means 271 to instruct coding means 261 of a termination of coding for a block.

Therefore, based on the above described draft specification for standardization, this invention allows an image data compressing apparatus to output a code indicating a termination of a block only when the last quantized coefficient is an insignificant coefficient.

Third Embodiment

Figure 13:
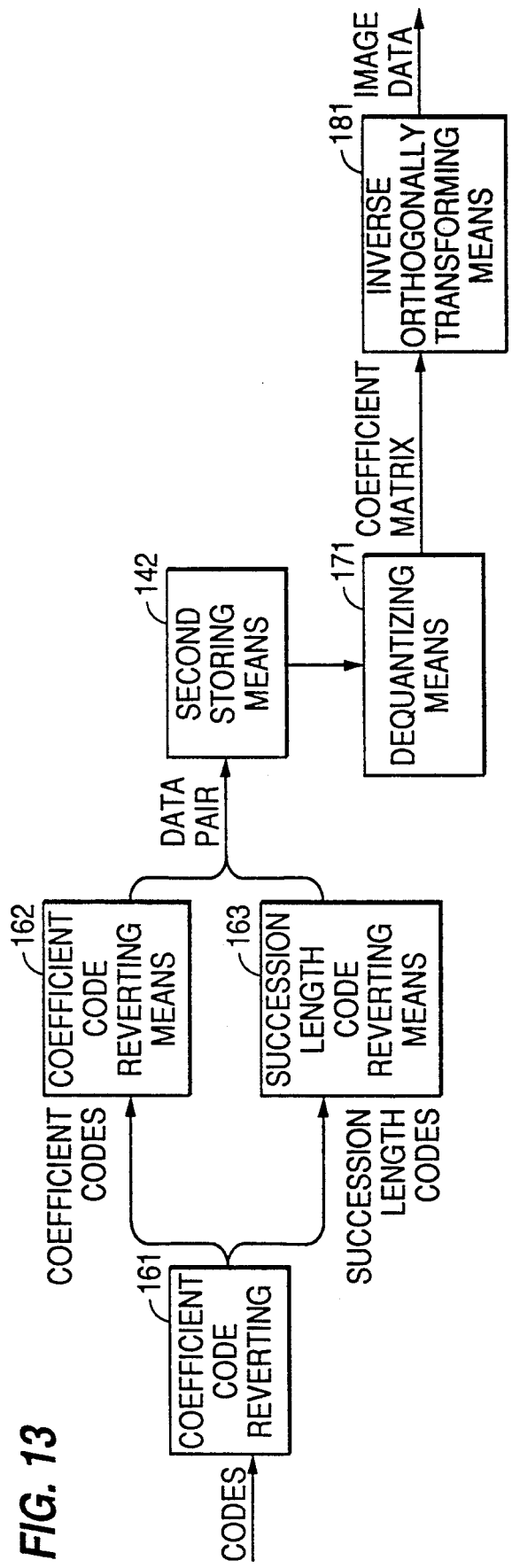
FIG. 13 is a block diagram of an image data reconstructing apparatus according to a third embodiment of this invention.

FIG. 13 is a block diagram of an image data reconstructing apparatus according to a third embodiment of this invention.

Here, the image data reconstructing apparatus reconstructs image data based on input codes created by coding coefficient codes and succession length codes converted from significant coefficients and insignificant coefficient succession lengths produced from among quantized coefficients obtained by quantizing the result of two-dimensionally orthogonally transforming image data in block units each comprising $N \times N$ picture elements.

A decoding means 161 decodes the input codes to the coefficient codes and succession length codes.

A coefficient code reverting means 162 reverts coefficient codes obtained by the decoding means 161 into corresponding significant coefficients.

A succession length code reverting means 163 reverts succession length codes obtained by the decoding means 161 into corresponding insignificant coefficient succession length.

The coefficient code reverting means 162 operates in parallel with the succession length code reverting means 163.

A second storing means 142 stores, as a data pair, a pair composed of a significant coefficient obtained by the coefficient code reverting means 162 and an insignificant coefficient succession length obtained by the succession length code reverting means 163.

The second storing means 142 has a memory capacity for storing data pairs for two (2) blocks of the image data; and the dequantizing means 171 dequantizes the already stored data pair in parallel with operations for generating and storing data pairs by the decoding means 161, the coefficient code reverting means 162 and the succession length code reverting means 163.

A dequantizing means 171 obtains appropriate transform coefficients by dequantizing significant coefficients based on significant coefficients and insignificant coefficient succession lengths expressed as data pairs read out from the second storing means 142, and outputs the transform coefficients as corresponding elements of a coefficient matrix having N rows and N columns.

An inverse orthogonally transforming means 181 two-dimensionally inverse-orthogonally transforms a coefficient matrix obtained by the dequantizing means 171, and outputs the transforming result as image data.

The decoding means 161, the coefficient code reverting means 162 and the succession length code reverting means 163 revert input codes to pairs of significant coefficients and insignificant coefficient succession length, which the second storing means 142 stores sequentially. Since the decoding means 161, the coefficient code reverting means 162 and the succession length code reverting means 163 can all operate independently one against another, they execute the decoding, the reversion of the coefficient codes and the reversion of the succession length code independently rather than serially, thereby expediting these processes.

The significant coefficients and the insignificant coefficient succession lengths are paired and the data pairs are supplied to the dequantizing means 171 through the second storing means 142. Thus, the dequantizing process is expedited, because it need not be deferred until significant coefficients and insignificant coefficient succession lengths are sorted, unlike in the prior art.

The inverse orthogonally transforming means 181 reconstructs image data by two-dimensionally orthogonally transforming the coefficient matrix obtained by the dequantizing means 171.

Since the coefficient code reverting means 162 and the succession length code reverting means 163 operate in parallelly, the significant coefficients and insignificant coefficient succession lengths corresponding to the decoding results by the decoding means 161 are obtained concurrently, thereby expediting the process according to the draft specification for standardization of decoding input codes into pairs of significant coefficients and insignificant coefficient succession lengths.

The second storing means 142 having a storage capacity for two (2) blocks of data pairs connects the coefficient code reverting means 162 and the succession length code reverting means 163 with the dequantizing means 171. The dequantization by the dequantizing means 171 in parallel with the generation and storage of the data pairs expedites the decoding and dequantization of the input codes.

Description of the Operations

Embodiments of this invention are explained further in detail by referring to attached drawings.

First Embodiment

Figure 14:
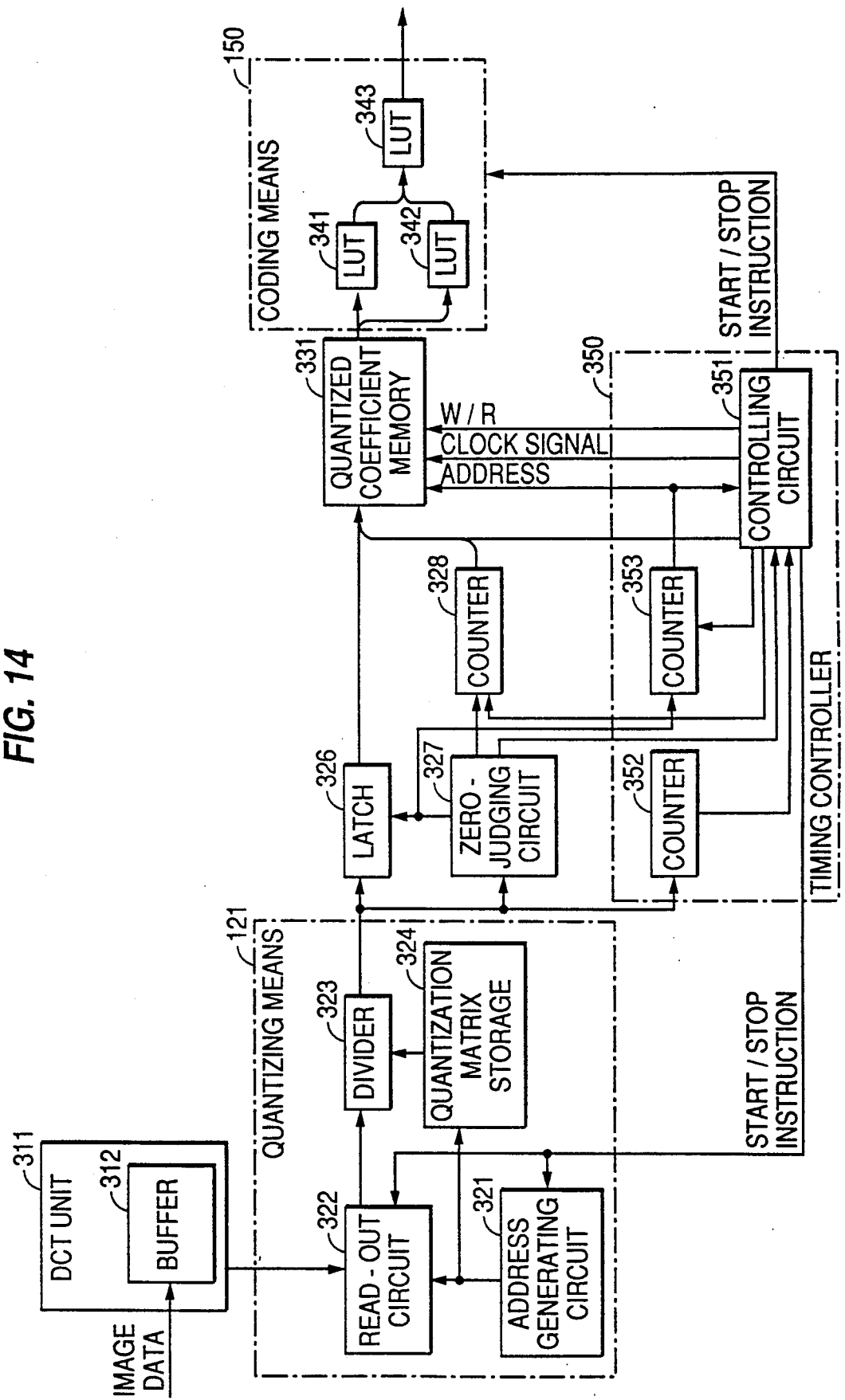
FIG. 14 shows in detail the configuration of an image data compressing apparatus according to the first embodiment of this invention.

FIG. 14 shows in detail the configuration of an image data compressing apparatus according to the first embodiment of this invention.

The correspondences between FIG. 11 and FIG. 14 are explained, first.

Orthogonally transforming means 111 corresponds to a DCT unit 311.

Quantizing means 121 corresponds to address generating circuit 321, read-out circuit 322, the divider 323, and a quantization matrix storage 324.

Selecting means 131 corresponds to latch 326 and zero-judging circuit 327.

The counting means 132 corresponds to zero-judging circuit 327 and a counter 328.

The first storing means 141 corresponds to a quantized coefficient memory 331 and a timing controller 350.

The coefficient converting means 151 corresponds to look-up table (hereafter abbreviated as LUT) 342.

The succession length converting means 152 corresponds to LUT 341.

The code generating circuit 153 corresponds to LUT 343.

Coding means 150 corresponds to LUTs 341, 342 and 343.

Assuming the above correspondence, the configurations and actions of the embodiments are as described below.

The configurations and actions of an image data compressing apparatus pursuant to this invention are explained initially.

As shown in FIG. 14, DCT unit 311 splits image data such as those read by an image scanner (not shown) into blocks each comprising 8×8 picture elements and DCTs respective blocks, producing a matrix (hereafter referred to as a DCT coefficient matrix D) having eight (8) rows and eight (8) columns of DCT coefficients, which a buffer 312 provided internally in DCT unit 311 temporarily stores before outputting it to quantizing means 121.

In quantizing means 121, address generating circuit 321 sequentially generates the addresses in buffer 312 according to the scanning sequence shown in FIG. 6, and read-out circuit 322 reads the corresponding elements in the DCT coefficient matrix D according to the addresses and inputs them to divider 323.

Also in quantizing means 121, quantization matrix storage 324 stores the quantization matrix $V_{TH}$ shown in FIG. 4 and inputs the elements of the quantization matrix $V_{TH}$ corresponding to the addresses obtained by address generating circuit 321.

Divider 323 quantizes respective elements of the DCT coefficient matrix D by dividing the inputted elements of the DCT coefficient matrix D by the corresponding elements of the quantization matrix $V_{TH}$.

Latch 326 and zero-judging circuit 327 sequentially receive the output from divider 323. Latch 326 and the counter 328 act in accordance with the judging result by zero-judging circuit 327.

The following is a description of the operations for generating and writing indices and runs.

A controlling circuit 351 in timing controller 350 outputs a logical "0" as a write/read control signal W/R to quantized coefficient memory 331, thus putting quantized coefficient memory 331 in a write enable state. Controlling circuit 351 instructs address generating circuit 321 and read-out circuit 322 in quantizing means 121 to start a read-out process. This triggers respective elements of the DCT coefficient matrix D to be read out from buffer 312 in DCT unit 311 to be supplied to zero-judging circuit 327.

Zero-judging circuit 327 described above judges whether or not the value of an inputted quantized coefficient is zero, and notifies controlling circuit 351 of the result. If it judges that an insignificant coefficient having the zero value is inputted, controlling circuit 351 instructs the counter 328 to increment its counter value by one (1) by outputting a count signal. On the other hand, if it judges that a significant coefficient having a non-zero value is inputted, controlling circuit 351 instructs counter 328 to clear its counter value later and latch 326 to hold the corresponding quantized coefficient by outputting a hold signal.

This enables latch 326 to selectively hold the value of a significant coefficient (i.e. index) and counter 328 to count the number of insignificant coefficients inputted in succession (i.e. run).

As a result, quantized coefficient memory 331 receives the indices and the runs generated contemporaneously.

In parallel with the generation of the indices and runs described above, each time divider 323 outputs a quantized coefficient, counter 352 in timing controller 350 increments its counter value by one (1) and supplies the updated counter value to controlling circuit 351. On receiving a hold signal, which causes latch 326 to hold an index, counter 353 increments its counter value by one (1) and supplies the updated counter value as an address to quantized coefficient memory 331.

Controlling circuit 351 outputs a clock signal synchronized to an input of the hold signal and instructs quantized coefficient memory 331 to store input data. This causes the same address in quantized coefficient memory 331 to store the index held in latch 326 and the counter value of counter 328 (i.e. run) at the same point in time are stored as a data pair.

FIG. 15 is an address table for explaining the storage position in quantized coefficient memory 331.

As shown in FIG. 15, the N most significant bits in storage areas corresponding to respective addresses store indices and the M least significant bits store runs. Here, the index of the DC element of a block, is expressed as sign "D". Other indices are expressed as sign "I" having a suffix number representing the appearance sequence. Runs paired with respective indices are expressed as sign "R" having the same suffix number representing the appearance sequence. The tail end of a block is expressed as sign "$R_{eob}$" in the run area of address "n". Also, since a DC element is at the head end of a block, there is no corresponding run.

Zero-judging circuit 327 need only clear the counter value of counter 328 after storing a run in quantized coefficient memory 331.

For instance, divider 323 receives respective elements of the DCT coefficient matrix D shown in FIG. 3 in a sequence comprising "91", "−17", "−28", ..., "−1", and produces quantized coefficients "5", "−2", "−3", ..., "0". In this example, first, latch 326 holds value "5" of the quantized coefficient corresponding to the DC element and address "1" of quantized coefficient memory 331 stores value "5" as an index. Second, latch 326 holds value "−2", and address "2" of quantized coefficient memory 331 stores a data pair composed of value "−2" as an index and counter value "0" of counter 328 as a run. Subsequent addresses of quantized coefficient memory 331 sequentially store data pairs in a similar manner. When the counter value of counter 352 reaches the number of picture elements in a block, [which is sixty-four (64) if a block comprises eight-by-eight (8×8) picture elements,] controlling circuit 351 in timing controller 350 outputs "$R_{eob}$" to quantized coefficient memory 331 in lieu of a run outputted from counter 328.

Here, because read-out circuit 322, divider 323, latch 326, zero-judging circuit 327, counter 328 and quantized coefficient memory 331 can all operate independently, the processes for reading out and quantizing respective elements of the DCT coefficient matrix D, as well as generating and storing indices and runs, can all be performed in parallel. Pipeline processing enables these processes to be expedited, thereby shortening the time required for image data compression.

FIG. 16 reveals the content of quantized coefficient memory 331 obtained by quantizing respective elements of the DCT coefficient matrix D shown in FIG. 3.

Thus, when quantized coefficient memory 331 completes the storage of the quantized coefficients for a block, controlling circuit 351 in timing controller 350 outputs a logical "1" as the write/read control signal W/R to quantized coefficient memory 331, thus putting quantized coefficient memory 331 in the read enable state. Controlling circuit 351 instructs coding means 150 to start a coding process and retains the counter value of counter 353 as a maximum address value $A_{max}$, and clears the counter values of counters 353 and 353.

Also, at a predetermined time interval, controlling circuit 351 instructs counter 352 to increment its counter value and outputs a clock signal to quantized coefficient memory 331, as an instruction for outputting appropriate data.

This triggers the data pairs to be outputted sequentially from quantized coefficient memory 331 to coding means 150.

Look-up table 341 in coding means 150 stores, in its addresses respectively having M bits, run codes according to the draft specification for standardization (JPEG-8-R8) corresponding to the runs expressed by the addresses. LUT 342 in coding means 150 stores, in its addresses respectively having N bits, index codes according to the same draft specification for standardization (JPEG-8-R8) corresponding to the indices expressed by the addresses.

Therefore, inputs of the N most significant bits and the M least significant bits of a data pair read from quantized coefficient memory 331 to LUTs 342 and 341 as their respective addresses produce an index code and a run code.

LUT 343 in coding means 150 stores, at addresses corresponding to pairs each made up of a run code and an index code, appropriate Huffman codes used for coding, in variable lengths, the run codes and the index codes obtained by LUTs 342 and 341.

Here, since LUTs 341, 342 and 343 can all operate independently, the processes for coding a run and an index, as well as coding a run code and an index code can all be performed parallel. Pipeline processing enables the coding processes to be expedited, thereby shortening the time required for image data compression.

For instance, at an interval of time period TAU required for the process of read-outs from LUTs 341, 342 and 343, controlling circuit 351 in timing controller 350 needs only to instruct counter 353 to increment its counter value. In this case, an output from counter 353 triggers quantized coefficient memory 331 to output a data pair composed of a new index and a new run to LUTs 342 and 341. Controlling circuit 351 judges that the process for reading out indices and runs of a block have been complete when the counter value of counter 353 reaches the value retained as the maximum address value $A_{max}$.

Controlling circuit 351 notifies coding means 150 of the completion of the read-out of a block, and instructs it to cease the coding processes.

Controlling circuit 351 in timing controller 350 again outputs the logical "0" as the write/read control signal W/R to quantized coefficient memory 331, thus putting quantized coefficient memory 331 in a write enable state. Controlling circuit 351 instructs address generating circuit 321 and read-out circuit 322 in quantizing means 121 to start another read-out process. This triggers respective elements of the DCT coefficient matrix D representing the next block to be readout from buffer 312 in DCT unit 311 to be supplied to zero-judging circuit 327. Then, the process for quantizing the next block starts By repeating the above processes for respective blocks, image data of a whole image are coded.

By providing quantized coefficient memory 331 with a memory capacity for data pairs obtained from two (2) blocks of quantized coefficients, coding means 150 can be configured to code data pairs stored in quantized coefficient memory 331 in parallel with the processes for quantizing a block, as well as generating and storing data pairs, by quantizing means 121.

This enables the time necessary for the processes of quantizing respective elements in the DCT coefficient matrix D for a block, as well as generating and coding data pairs, to be further shortened.

Figure 17:
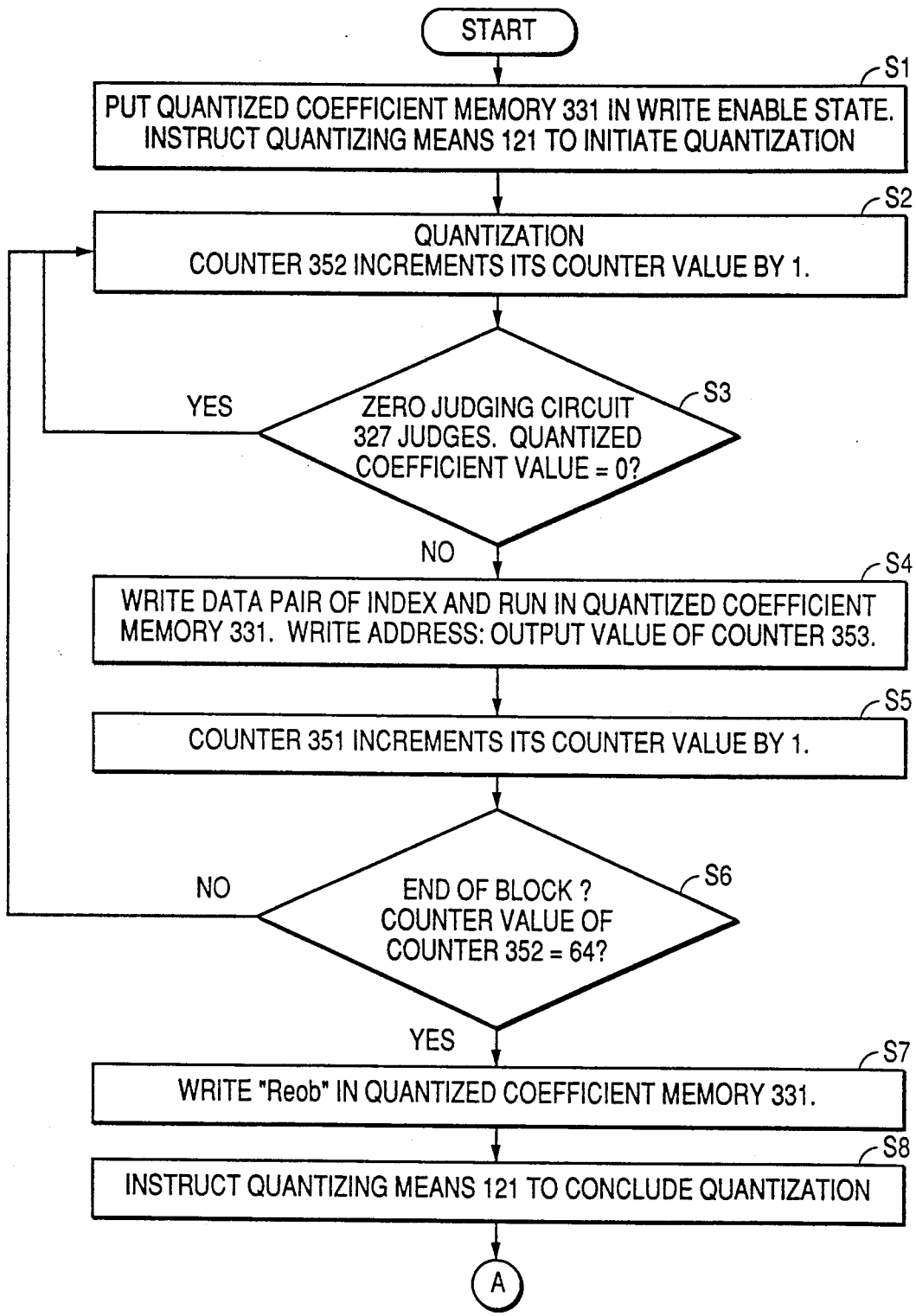
FIGS. 17 and 18 are flowcharts explaining the operations of an image data compressing apparatus according to the first embodiment of this invention.
Figure 18:
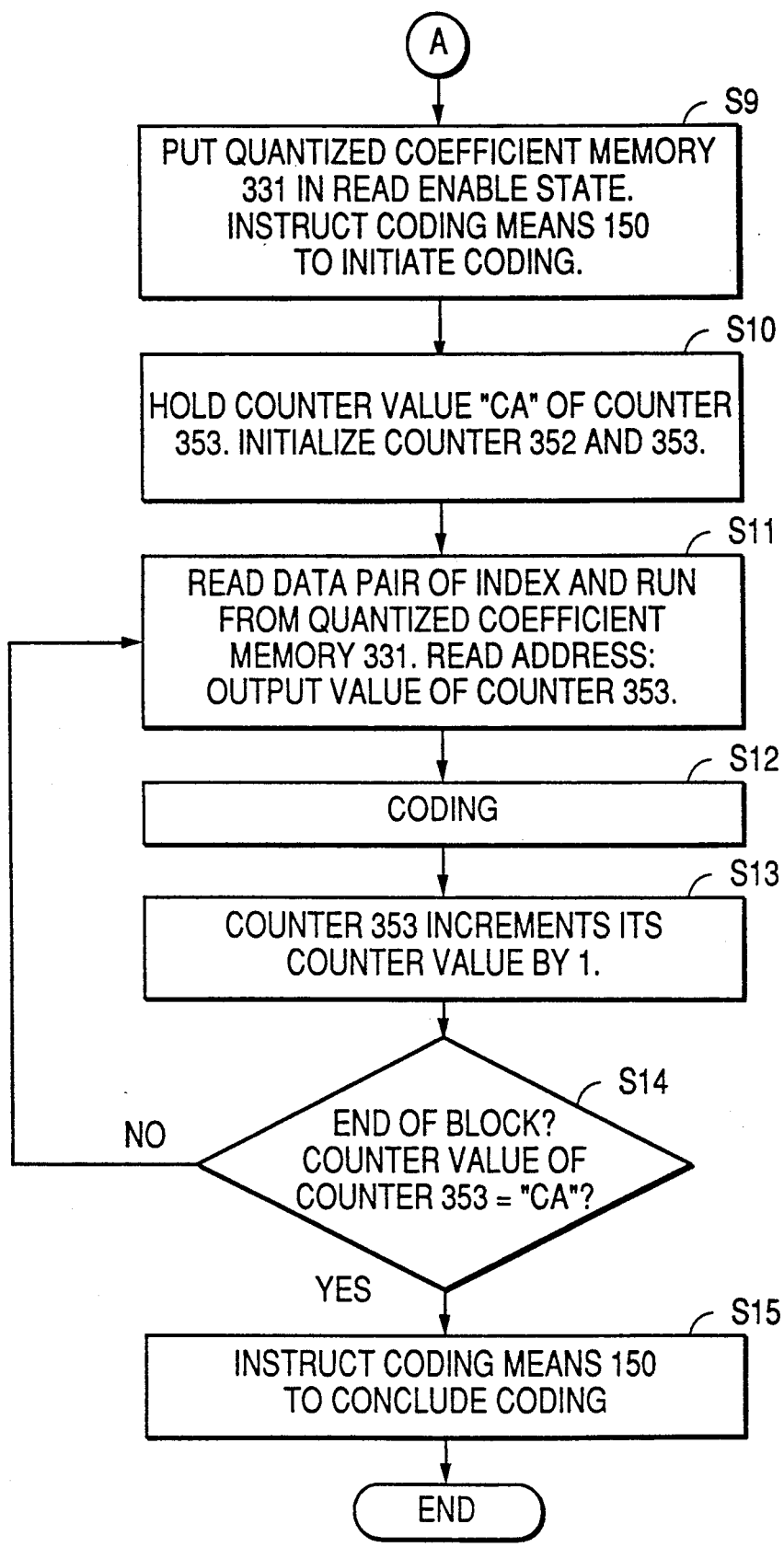

FIGS. 17 and 18 are flowcharts for explaining the processings, e.g. in software, by controlling circuit 351 in timing controller 350, which governs the operations of an image data compressing apparatus according to the first embodiment of this invention.

More specifically, FIGS. 17 and 18 illustrate the breakdown of quantization and coding for a block of image data by the image data compressing apparatus shown in FIG. 14, which actually pipelines image compressions in block units. A sign "◯" [encircled A] in FIGS. 11 and 18 is a connector expressing the continuation of operations.

When buffer 312 stores the DCT coefficients of a block after DCT unit 311 completes DCTing the block, the processes shown in FIGS. 17 and 18 start, which are described as follows.

Step S1: Controlling circuit 351 puts quantized coefficient memory 331 in a write enable state and instructs quantizing means 121 to initiate the quantization.

Step S2: Quantizing means 121 reads out one (1) of the DCT coefficients stored in buffer 312, outputs it to latch 326 and zero-judging circuit 327, and has counter 352 increment its counter value by one (1).

Step S3: Zero-judging circuit 327 judges whether or not the value of a quantized coefficient outputted from quantizing means 121 is zero (0). If it is zero (0) [Y], zero-judging circuit 327 has counter 328 increment its counter value by one (1), and the process reverts to step S2. If it is not zero (0) [N], the process proceeds to step S4.

Step S4: Controlling circuit 351 causes quantized coefficient memory 331 to store the quantized coefficient held in latch 326 (i.e. index) and the counter value of counter 328 (i.e. run).

Step S5: Controlling circuit 351 causes counter 353 to increment its counter value by one (1).

Step S6: Controlling circuit 351 detects an end of a block by judging whether or not the counter value of counter 352 reaches the number of the picture elements in a block[, which is sixty-four (64) when it comprises eight-by-eight (8×8) picture elements]. If the counter value of counter 352 does not reach sixty-four (64) [N], the process reverts to step S2. If the counter value of counter 352 reaches sixty-four (64) [Y], after all DCT coefficients of a block are quantized and quantized coefficient memory 331 stores the indices and the runs for the block, the process proceeds to step S7.

Step S7: Controlling circuit 351 has quantized coefficient memory 331 store the end-of-block signal $R_{eob}$. The process continues to step S8.

Step S8: Controlling circuit 351 instructs quantizing means 121 to conclude the quantization for the block.

Thus, steps S1 through S8 complete the quantization and the conversion of quantized coefficients into indices and runs, and the process proceeds to step S9 for coding.

Step S9: Controlling circuit 351 puts quantized coefficient memory 331 to a read enable state and instructs coding means 150 to initiate the coding. The process leads to step S10.

Step S10: Controlling circuit 351 has quantized coefficient memory 331 hold a counter value CA of counter 353, and initializes counters 352 and 353. The process goes on to step S11.

Step S11: Controlling circuit 351 has coding means 150 read out a first data pair of an index and run from an address, which as the counter value of counter 353, in quantized coefficient memory 331. The process proceeds to step S12.

Step S12: Controlling circuit 351 instructs coding means 150 to convert the index and the run in the first data pair into an index code paired with a run code and to further code the pair comprising the index code and the run code in variable length e.g. into a Huffman code. The process continues to step S13.

Step S13: Controlling circuit 351 has counter 353 increment its counter value by one (1). The process continues to step S14.

Step S14: Controlling circuit 351 judges whether or not the counter value CA obtained in step S10 is equal to the counter value of counter 353. If it is not [N], the process reverts to step S11, because a data pair of an index and a run still remains in quantized coefficient memory 331. If it is [Y], the process continues to S15.

Step S15: Controlling circuit 351 instructs coding means 150 to conclude the coding, thus terminating all the processes.

Second Embodiment

Figure 19:
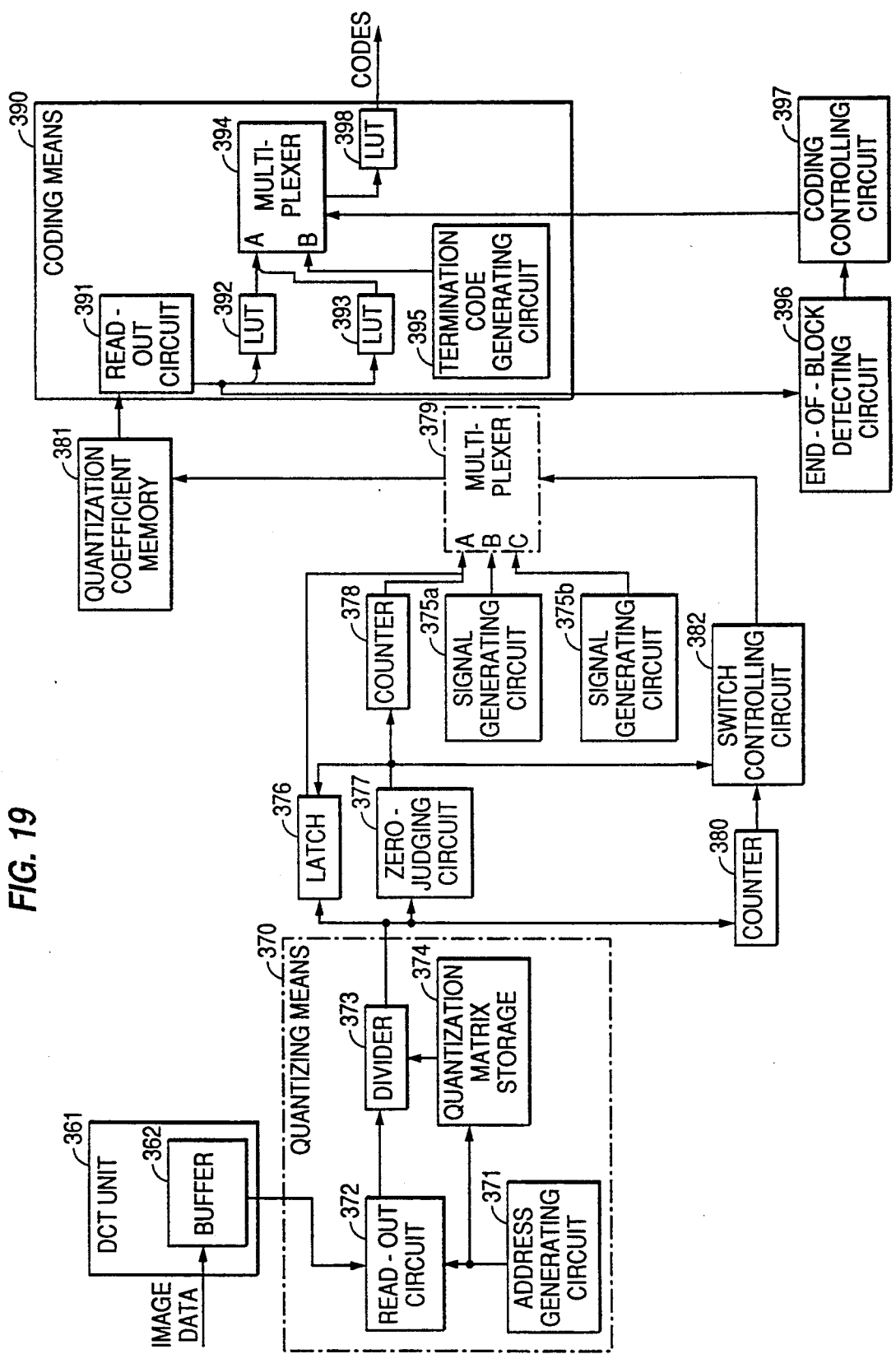
FIG. 19 shows in detail the configuration of an image data compressing apparatus according to the second embodiment of this invention.

FIG. 19 shows in detail the configuration of an image data compressing apparatus according to the second embodiment of this invention.

The correspondences between FIG. 12 and FIG. 19 are explained, first.

Orthogonally transforming means 211 corresponds to DCT unit 361.

Quantizing means 221 corresponds to address generating circuit 371, read-out circuit 372, divider 373, and quantization matrix storage 374.

The converting means 231 corresponds to latch 376, zero-judging circuit 377, and counter 378.

The first generating means 242 corresponds to signal generating circuit 375a.

The second generating means 243 corresponds to signal generating circuit 375b.

Selecting means 244 corresponds to multiplexer 379.

The generating means 241 corresponds to the signal generating circuits 375a and 375b and multiplexer 379.

The attaching means 251 corresponds to the switch controlling circuit 382, counter 380, multiplexer 379 and quantized coefficient memory 381.

Coding means 261 corresponds to read-out circuit 391, look-up tables 392, 393 and 398, the termination code generating circuit 395, and multiplexer 394.

The judging means 272 corresponds to end-of-block detecting circuit 396.

The instructing means 271 corresponds to end-of-block detecting circuit 396 and the coding controlling circuit 397.

Assuming the above correspondence, the configuration and action of the embodiment are as described below.

As shown in FIG. 19, DCT unit 361 splits image data such as those read by an image scanner (not shown) into blocks each comprising 8×8 picture elements and DCTs respective blocks, producing a matrix (hereafter referred to as a DCT coefficient matrix D) having eight (8) rows and eight (8) columns of DCT coefficients, which a buffer 362 provided internally in DCT unit 361 temporarily stores before outputting it to quantizing means 370.

In quantizing means 370, address generating circuit 371 sequentially generates the addresses in buffer 362 according to the scanning sequence shown in FIG. 6, and read-out circuit 372 reads the corresponding elements in the DCT coefficient matrix D according to the addresses and inputs them to divider 73.

Also in quantizing means 370, quantization matrix storage 374 stores the quantization matrix $V_{TH}$ shown in FIG. 4 and inputs to divider 373 the elements of the quantization matrix $V_{TH}$ corresponding to the addresses obtained by address generating circuit 371.

Divider 373 quantizes respective elements of the DCT coefficient matrix D by dividing the inputted elements of the DCT coefficient matrix D by the corresponding elements of the quantization matrix $V_{TH}$.

Latch 376 and zero-judging circuit 377 sequentially receive the output from divider 373. Latch 376 and counter 378 act in accordance with the judging result by zero-judging circuit 377.

Zero-judging circuit 377 described above judges whether or not the value of an inputted quantized coefficient is zero, and supplies the judging result to latch 376 and counter 378. The counter 378 is activated and increments the counter value by one (1) according to a clock signal (not shown) synchronized with the input of a quantized coefficient, when zero-judging circuit 377 judges that the inputted quantized coefficient is an insignificant coefficient having the zero value.

Latch 376 is activated and holds the corresponding quantized coefficient according to the above described clock signal, when zero-judging circuit 377 judges that the inputted quantized coefficient is a significant coefficient having a non-zero value. At this time, counter 378 outputs the counter value and clears it subsequently.

This enables latch 376 to selectively hold the value of a significant coefficient (i.e. index) and counter 378 to count the number of insignificant coefficients inputted in succession (i.e. run).

Thus, the converting means 231 composed of latch 376, zero-judging circuit 377 and counter 378 converts a series of quantized coefficients into serial pairs of indices and runs, hereafter referred to as serial quantized coefficients.

An input port A of multiplexer 379 receives, as an input datum, an index paired with a run included in the serial quantized coefficients.

Signal generating circuit 375a outputs, as a first termination signal, a predetermined bit pattern "$R_{eob1}$" to an input port B of multiplexer 379 described above. Similarly, signal generating circuit 375b outputs, as a second termination signal, a different bit pattern "$R_{eob2}$" to an input port C of multiplexer 379. The above described signal generating circuits 375a and 375b need only generate bit patterns "$R_{eob1}$" and "$R_{eob2}$" different from those expressing indices and runs.

In parallel with the above described generation of the serial quantized coefficients, counter 380 increments the counter value by one (1) and then supplies the counter value to the switch controlling circuit 382, each time divider 373 outputs a quantized coefficient. Based on the counter value of counter 380, the switch controlling circuit 382 judges whether or not the quantized coefficients for a block have been received in full. The switch controlling circuit 382 instructs multiplexer 379 to select input port A, upon judging that the quantized coefficients are not received in full. The switch controlling circuit 382 instructs multiplexer 379 to select input port B, or input port A and then input port C, depending on whether zero-judging circuit 377 described above judges the last quantized coefficient to be an insignificant coefficient or a significant coefficient, upon judging that the quantized coefficients are not received in full.

According to the instruction from the switch controlling circuit 382, multiplexer 379 outputs input data received at respective input ports to quantized coefficient memory 381.

Hence, until the counter value of counter 380 reaches the number of the picture elements in a block, multiplexer 379 selects input port A and sequentially outputs the serial quantized coefficients comprising runs paired with indices, which are then stored in quantized coefficient memory 381. Subsequently, when the quantized coefficients for a block are received in full, depending on whether or not the last quantized coefficient is an insignificant coefficient, multiplexer 379 selects either input port B or input port C, allowing either bit pattern "$R_{eob1}$" or bit pattern "$R_{eob2}$", and quantized coefficient memory 381 similarly stores either of those bit patterns.

For instance, when the elements of the DCT coefficient matrix D read by the zig-zag scanning sequence shown in FIG. 6 are quantized, the quantized coefficient corresponding to the DCT coefficient last read out must be an insignificant coefficient. Thus, in this case, multiplexer 379 outputs bit pattern "$R_{eob1}$" received at input port B to quantized coefficient memory 381, which stores the bit pattern after the serial quantized coefficients comprising six (6) pairs of runs and indices corresponding to respective elements of the above described DCT coefficient matrix D.

Thus, when the last quantized coefficient is an insignificant coefficient, bit pattern "$R_{eob1}$" as a termination signal is added to the tail end of the serial quantized coefficients, as shown in FIG. 20A.

FIGS. 20A and 20B show exemplary configurations of serial quantized coefficients.

However, when the last quantized coefficient is a significant coefficient, upon receiving the last quantized coefficient, multiplexer 379 outputs bit pattern "$R_{eob2}$" supplied to input port C to be stored in quantized coefficient memory 381. This allows bit pattern "$R_{eob2}$" as a termination signal to be added to the tail end of the serial quantized coefficients after the pair of run "$R_e$" and index "$I_e$" representing the last significant coefficient.

In FIGS. 20A and 20B, the index of the DC element of a block, which is inputted first, is expressed as sign "D". Other indices are expressed as sign "I" having a suffix number representing the appearance sequence. Runs paired with respective indices are expressed as sign "R" having the same suffix number representing the appearance sequence.

The following is a description of the process by which coding means 390 codes the indices and runs stored in quantized coefficient memory 381.

Read-out circuit 391 sequentially reads the pairs of runs and indices included in the serial quantized coefficients, which are stored in quantized coefficient memory 381, and supplies the read out runs to look-up table (hereafter abbreviated as LUT) 392 as addresses and the read-out indices to LUT 393 as addresses.

LUT 392 stores at respective addresses run codes corresponding to the runs expressed by the addresses. LUT 393 stores at respective addresses index codes corresponding to the indices expressed by the addresses.

Therefore, on receipt of runs and indices, LUT 392 and LUT 393 respectively output the corresponding run codes and index codes to input port A of multiplexer 394.

The termination code generating circuit 395 generates a termination code defined as a code representing the end of a block under the draft specification for standardization, and supplies the termination code to input port B of multiplexer 394 described above.

Multiplexer 394 operates in accordance with the instructions from the coding controlling circuit 397.

The following is a description of the switching process of multiplexer 394 and the process of coding the run codes and the index codes.

End-of-block detecting circuit 396 sequentially receives the serial quantized coefficients read out by read out circuit 391, detects bit patterns "$R_{eob1}$" and "$R_{eob2}$", and outputs the detection result to the coding controlling circuit 397.

The coding controlling circuit 397 ordinarily instructs multiplexer 394 to select input port A, and instructs the same to select input port B when end-of-block detecting circuit 396 detects bit pattern "$R_{eob1}$".

For instance, when the pairs of runs and indices shown in FIG. 20A are sequentially read out, the coding controlling circuit 397 instructs multiplexer 394 to select input port A, until bit pattern "$R_{eob1}$" is read out in the seventh time. Then, multiplexer 394 supplies to LUT 398 as its addresses the pairs of run codes and index codes respectively outputted from LUT 392 and LUT 393.

LUT 398 stores appropriate Huffman codes at the addresses corresponding to the pairs of index codes and run codes.

Thus, upon receipt of the pairs of run codes and index codes respectively obtained by LUTs 392 and 393, LUT 398 outputs the appropriate Huffman codes.

In this manner, the serial quantized coefficients shown in FIG. 20A are sequentially coded starting at index "D" corresponding to the DC element, and the coding controlling circuit 397 instructs multiplexer 394 to select input port B when bit pattern "$R_{eob1}$" stored as the termination signal is read out.

This causes multiplexer 394 to output to LUT 398 a termination code supplied from the termination code generating circuit 395 to be converted to a corresponding code.

Accordingly, in this case, as shown in FIG. 7A, code "$C_6$" corresponding to the pair of run "$R_5$" and index "$I_5$" representing the last significant coefficient is followed by the "EOB" code corresponding to the termination code, which indicates that all the following quantized coefficients are insignificant coefficients.

Also, at this time, the coding controlling circuit 397 judges that the process for coding a block has ended and instructs read-out circuit 391 to stop reading out a quantized coefficient from quantized coefficient memory 381.

Meanwhile, when quantized coefficient memory 381 stores serial quantized coefficients shown in FIG. 20B, bit pattern "$R_{eob2}$" stored as the termination signal is read out after run "$R_e$" paired with index "$I_e$" corresponding to the last significant coefficient. Then, on receiving an output from end-of-block detecting circuit 396, the coding controlling circuit 397 judges that the process for coding a block has ended, and similarly instructs read-out circuit 391 to stop reading out a quantized coefficient from quantized coefficient memory 381.

In this case, however, since the coding controlling circuit 397 does not instruct multiplexer 394 to select input port B, the "EOB" code corresponding to the termination code is not attached to the tail end but instead code "$C_e$" for run "$R_e$" paired with index "$I_e$" corresponding to the last significant coefficient remains the last code, as shown in FIG. 7B.

Thus, the serial quantized coefficients for a block stored in quantized coefficient memory 381 are coded in variable lengths.

By repeating the above described processes for quantizing and coding a block for respective blocks of an image, its image data are coded.

As described above, the switch controlling circuit 382 switches multiplexer 379 to attach a termination signal representing an end-of-block at the tail end of the serial quantized coefficients for a block, and coding means 390 detects the termination signal, thereby enabling the end of serial quantized coefficients for a block to be recognized.

Here, the process for quantizing respective elements of DCT coefficient matrix D and the process for converting the obtained quantized coefficients into serial quantized coefficients comprising pairs of runs and indices are performed separately and independently for each block. Also, the process for coding serial quantized coefficients is performed separately and independently for each block.

Consequently, this invention enables the quantizing process and the coding process, which have been executed in a single unit, to be separated into two (2) distinct processes executed by two (2) separate circuits, which quantized coefficient memory 381 interconnects, thereby simplifying a circuit configuration.

This enables all the circuits for the quantizing and coding processes to be controlled easily. Also, since the quantizing circuit module on the input side of quantized coefficient memory 381 can operate independently from the coding circuit module on the output side of the same for independent performance evaluations during a test, the normality of respective circuits modules can be ascertained easily.

Since the coding circuit module judges an end of a block on detecting a termination signal, a circuit for accumulating the number of runs is no longer necessary, thereby simplifying the coding circuit module.

Because the switch controlling circuit 382 switches multiplexer 379 according to the judging result of zero-judging circuit 377, either of two (2) bit patterns "$R_{eob1}$" or "$R_{eob2}$" is selected as the termination signal to be attached to the tail end of the serial quantized coefficients depending on whether or not the last quantized coefficient is an insignificant coefficient.

This enables the coding circuit module to perform coding according to the draft specification for standardization by judging whether or not the last quantized coefficient is an insignificant coefficient.

Also, since the quantizing circuit module and the coding circuit module can operate independently of each other, it becomes possible to expedite the quantizing process and the coding process in comparison with the conventional processing of performing both processes in a series, thereby realizing a faster image data compressing apparatus.

Further, by providing a memory with a storage capacity for two (2) blocks of serial quantized coefficients, this invention can configure the coding circuit module to code the serial quantized coefficients for the preceding block stored in quantized coefficient memory 381 in parallel with the process of quantizing a block by the quantizing circuit module.

This enables the time necessary for quantizing and coding respective elements of the DCT coefficient matrix D for a block to be further shortened.

· Third Embodiment

Figure 21:
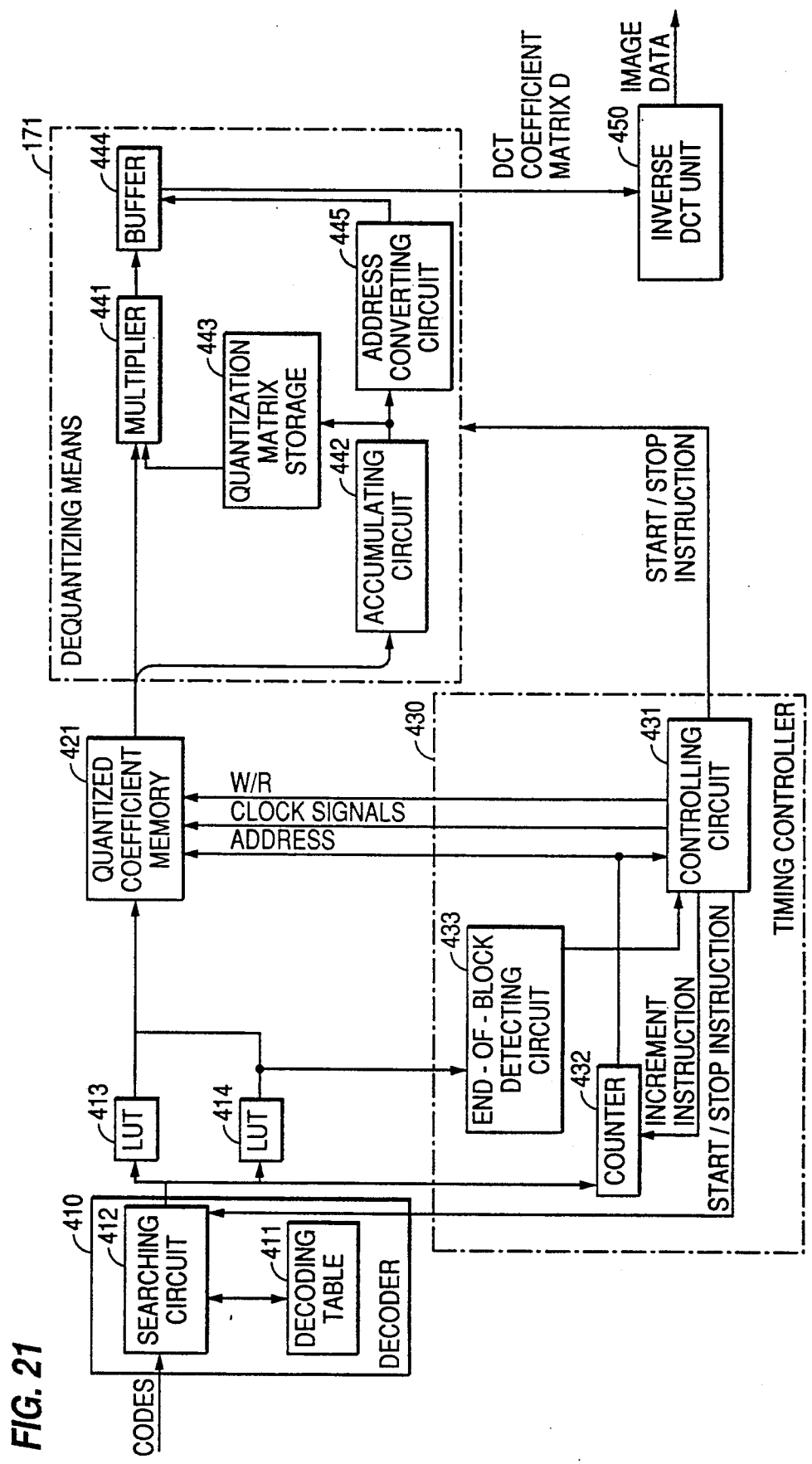
FIG. 21 shows in detail the configuration of an image data reconstructing apparatus according to the third embodiment of this invention.

FIG. 21 shows in detail the configuration of an image data reconstructing apparatus according to the third embodiment of this invention.

The correspondences between FIG. 13 and FIG. 21 are explained, first.

The decoding means 161 corresponds to the decoder 410 comprising the decoding table 411 and the searching circuit 412.

The coefficient code reverting means 162 corresponds to LUT 413.

The succession length code reverting means 163 corresponds to LUT 414.

The second storing means 142 corresponds to quantized coefficient memory 421 and timing controller 430.

The dequantizing means 171 corresponds to the multiplier 441, the accumulating circuit 442, quantization matrix storage 443, buffer 444 and the address converting circuit 445.

The inverse orthogonally transforming means 181 corresponds to inverse DCT unit 450.

Assuming the above correspondence, the configurations and actions of the embodiments are as described below.

In FIG. 21, the decoder 410 decodes an input code by referring to the decoding table 411 storing corresponding relations between respective Huffman codes and pairs of index codes and run codes. On receiving an input code, the decoder 410 has the searching circuit 412 search the decoding table 411 for the corresponding pair of an index code and a run code, and supplies the obtained index and run codes to LUTs 413 and 414 as respective address inputs.

LUT 413 stores at its addresses corresponding to respective index codes N-bit data representing indices, and LUT 414 stores at its addresses corresponding to respective run codes M-bit data representing runs.

When the processes for decoding code data corresponding respective blocks begins, a controlling circuit 431 is a timing controller 430 outputs a logical "0" as a write/read control signal W/R to a quantized coefficient memory 421 and puts quantized coefficient memory 421 in the write enable state Then, controlling circuit 431 instructs the searching circuit 412 to initiate a searching process.

On receiving such an instruction, the searching circuit 412 and LUTs 413 and 414 start their operations, and the searching circuit 412 outputs the index code and run code searched from the decoding table 411 respectively to LUTs 413 and 414. Upon receiving such an input, LUTs 413 and 414 respectively output the corresponding index and run to quantized coefficient memory 421.

Each time the searching circuit 412 outputs a searching result, counter 432 in timing controller 430 increments its counter value by one (1), and supplies the updated counter value, as address for storing the data pairs each composed of an index and a run, to quantized coefficient memory 421. Controlling circuit 431 outputs a clock signal synchronized with the output timing of LUTs 413 and 414, and instructs quantized coefficient memory 421 to store the data pairs.

As with quantized coefficient memory 331, quantized coefficient memory 421 stores an index in the N most significant bits of the storage area corresponding to the designated address and a run in the M least significant bits of the storage area corresponding to the designated address, for example.

Thus, quantized coefficient memory 412 stores the data pairs of indices and runs outputted from LUTs 413 and 414 in the addresses corresponding to the counter values specified by counter 432 in quantized coefficient memory 421.

Here, since the searching circuit 412 and LUTs 413 and 414 car all operate independently of each other, the process for decoding an input code to an index code and a run code, the process for reconstructing an index from an index code and the process for reconstructing a run from a run code can be executed all in parallel.

This, compared with executing those processes sequentially, enables the decoding process to be expedited and the time necessary for an image data reconstruction to be shortened.

In parallel with the decoding process described above, the end-of-block detecting circuit 433 in timing controller 430 searches the runs outputted from LUT 414, and notifies controlling circuit 431 of a detection of an end of a block, upon detecting a run "$R_{eob}$" representing an end of a block.

On receipt of the notification, controlling circuit 431 instructs the searching circuit 412 to cease its searching process, and stops the decoding process.

At this time, controlling circuit 431 holds the counter value of counter 432 as the maximum $A_{max}$ and then clears the counter value of counter 432. Next, controlling circuit 431 outputs a logical "1" as the read/write control signal W/R, puts quantized coefficient memory 421 in a read enable state, and instructs the dequantizing means 171 to initiate a dequantizing process. Also, at this time, controlling circuit 431 clears the content in buffer 444. Then, controlling circuit 431 instructs counter 432 to increment its counter value at a predetermined time interval and quantized coefficient memory 421 to output a data pair stored in the address corresponding to the counter value of counter 432.

This triggers quantized coefficient memory 421 to sequentially output data pairs. A multiplier 441 in the dequantizing means 171 receives the N most significant bits of the data pairs as the indices. An accumulating circuit 442 receives the M least significant bits of the data pairs as the runs.

The accumulating circuit 442 sequentially accumulates the values of the outputted runs and supplies the accumulation result to a quantization matrix storage 443.

Quantization matrix storage 443 stores respective elements of the quantization matrix $V_{TH}$ in correspondence with the scanning sequence shown in FIG. 6, and supplies the corresponding elements of the quantization matrix $V_{TH}$ to the multiplier 441 on receipt of an accumulation result.

The accumulation result obtained by the accumulating circuit 442 indicates the scanned number, in accordance with the scanning sequence shown in FIG. 6, of the element in the DCT coefficient matrix D corresponding to the index inputted together with the run. The scanned number manifests the position of the element in the DCT coefficient matrix. Hence, upon receiving the accumulation result, quantization matrix storage 443 outputs the quantization threshold corresponding to the above described element in the DCT coefficient matrix D.

Accordingly the multiplier 441 receives an index and the element in the quantization matrix $V_{TH}$ corresponding to the index, performs a multiplication and inputs the obtained product to buffer 444.

Parallelly with the multiplication, an address converting circuit 445 converts the scanned number obtained by the accumulating circuit 442 to an address representing an appropriate position in a two-dimensional array in buffer 444, and inputs the conversion result to buffer 444 as the address. This causes buffer 444 to store the product inputted from the multiplier 441 in the appropriate address.

Therefore, the DCT coefficient matrix D having eight (8) rows and eight (8) columns is reconstructed from the data pairs stored in quantized coefficient memory 421.

Here, since the multiplier 441 and the address converting circuit 445 can operate independently from each other, the multiplication between an index and the corresponding element in the quantization matrix $V_{TH}$ can be executed in parallel with the generation of the address for storing the product. This, compared with sequential processing, expedites the processes.

Parallelly with the dequantization discussed above, controlling circuit 431 in timing controller 430 compares the counter value of counter 432 with the maximum address $A_{max}$, and judges the end of read-outs of indices and runs of a block when the two (2) compared values match.

Controlling circuit 431 instructs the dequantizing means 171 to cease the dequantization, and inverse DCT unit 450 to initiate an inverse DCT process.

This triggers inverse DCT unit 450 to execute a two-dimensional inverse DCT for the DCT coefficient matrix D stored in buffer 444, thereby reconstructing image data of a block.

Figure 22:
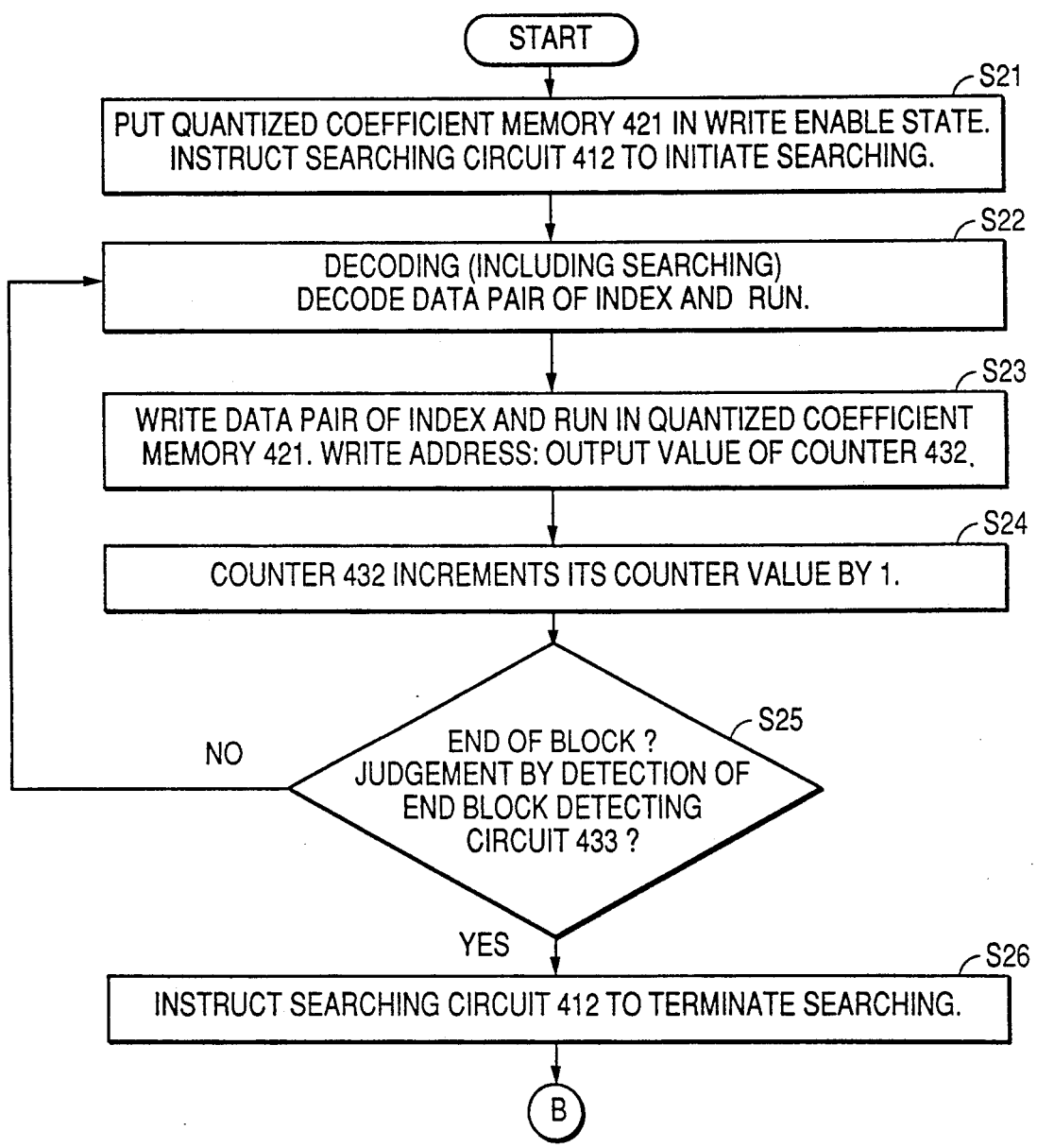
FIGS. 22 and 23 are flowcharts explaining the operations of an image data reconstructing apparatus according to the third embodiment of this invention.
Figure 23:
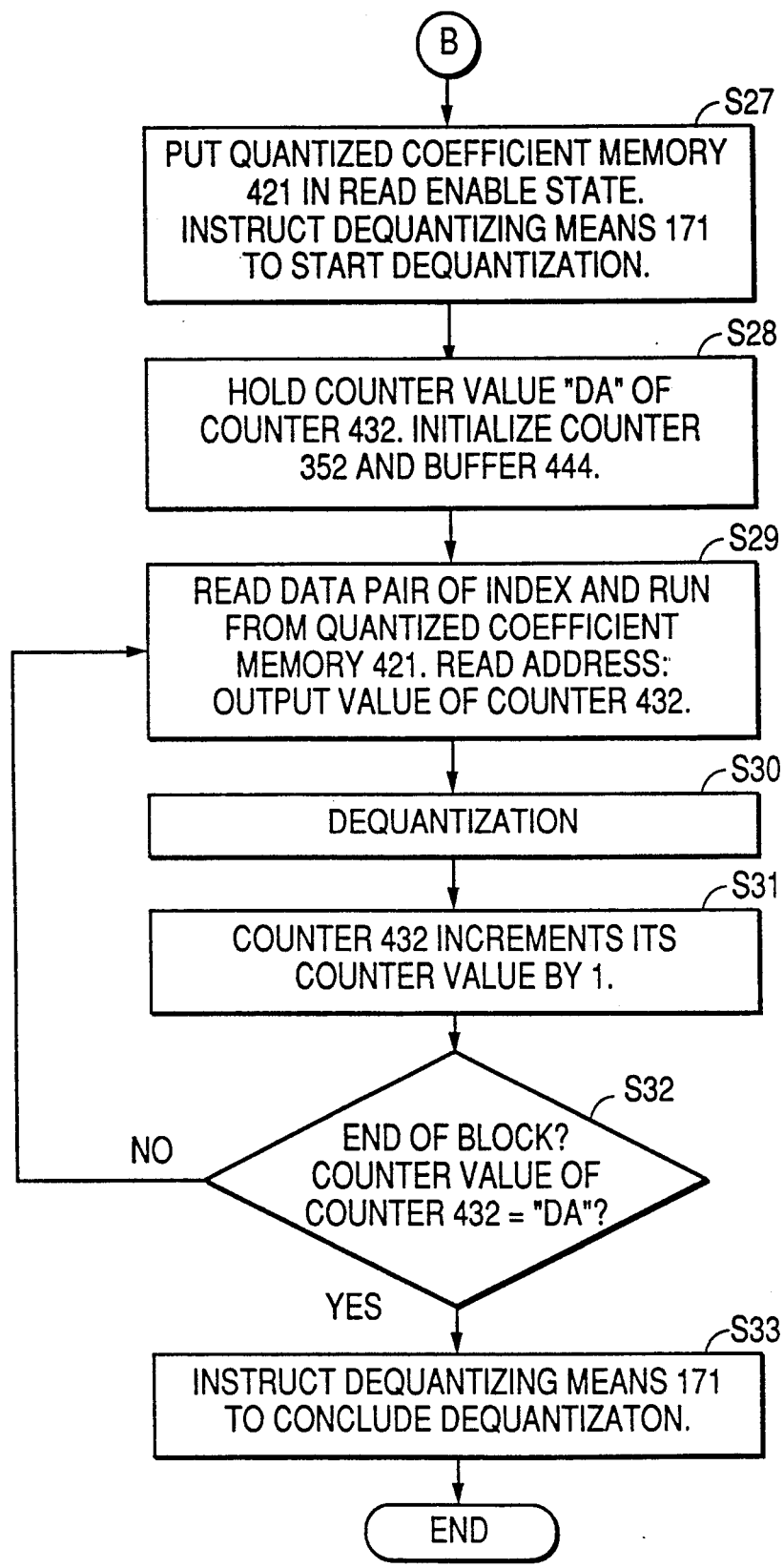
Figure 24:
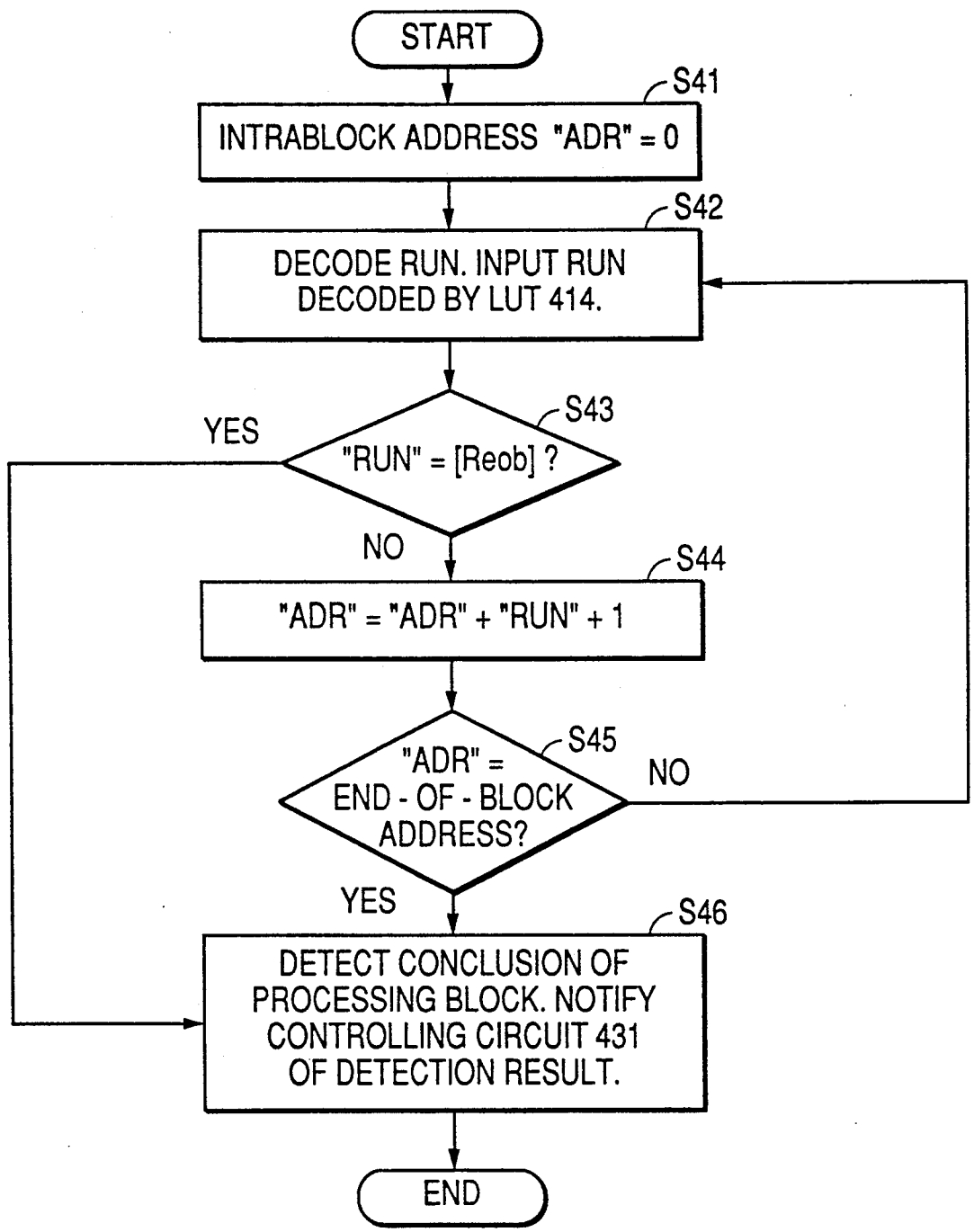
FIG. 24 is a flowchart explaining the operations of an end-of-block detector.

FIGS. 22, 23 and 24 are flowcharts for explaining the processings, e.g. in software, by controlling circuit 431 in timing controller 430, which governs the operations of an image data reconstructing apparatus according to the third embodiment of this invention.

More specifically, FIGS. 22 and 23 illustrate the breakdown of dequantization and decoding for a block of image data by the image data reconstructing apparatus shown in FIG. 21, which actually pipelines image reconstructions in block units. A sign "B" [encircled B] in FIGS. 22 and 23 is a connector expressing the continuation of operations.

When the searching circuit 412 receives the input codes of a block, the processes shown in FIGS. 22 and 23 start, which are described as follows.

Step S21: Controlling circuit 431 puts quantized coefficient memory 421 in a write enable state and instructs the searching circuit 412 to initiate the quantization. The process continues to step S22.

Step S22: The searching circuit 412 decodes the input codes, e.g. Huffman codes, into pairs comprising index codes and run codes by referring to the decoding table 411, and further decodes the pairs into data pairs comprising indices and runs by referring to LUTs 413 and 414. The process proceeds to step S23.

Step S23: Controlling circuit 431 instructs quantized coefficient memory 421 to store the data pairs comprising indices and runs at the addresses corresponding to the counter values outputted from counter 432. The process proceeds to step S24.

Step S24: Controlling circuit 431 instructs counter 432 to increment its counter value by one (1). The process goes on to step S25.

Step S25: End-of-block detecting circuit 433 judges the end of a block by detecting the termination code "EOB" shown in FIG. 7A at the tail end of a block or by counting all sixty-four (64) quantized coefficients in an eight-by-eight ($8 \times 8$) block. When controlling circuit 431 receives a negative judgment [N] from end-of-block detecting circuit 433, the process reverts to step S22. When controlling circuit 431 receives an affirmative judgment [Y] from end-of-block detecting circuit 433, the process continues to step S26.

Step S26: Controlling circuit 431 instructs the searching circuit 412 to terminate the searching operation. The process proceeds to step S27.

Step S27: Controlling circuit 431 puts quantized coefficient memory 421 in a read enable state and instructs the dequantizing means 171 to start dequantizing the input codes of a block. The process continues to step S28.

Step S28: Controlling circuit 431 holds a counter value "DA" hit hereto stored in counter 432 and initializes counter 432 and buffer 444. The process goes on to step S29.

Step S29: Controlling circuit 431 reads a data pair comprising an index and a run from an address, corresponding to the counter value of count 432, in quantized coefficient memory 421. The process continues to step S30.

Step S30: Controlling circuit 431 instructs the dequantizing means 171 to have its elements perform dequantization for the data pair. The process goes on to step S31.

Step S31: Controlling circuit 431 has counter 432 increment its counter value by one (1). The process continues to step S32.

Step S32: Controlling circuit 431 judges whether or not all the data pairs in a block are dequantized by comparing the value of counter 432 is equal to the counter value "LA". If the value of counter 432 has not reached the counter value "DA" [N], controlling circuit 431 determines that not all the data pairs are dequantized yet, and the process reverts to step S29. If the value of counter 432 reaches the counter value "DA" [Y], controlling circuit 431 determines that all data pairs have been dequantized, and the process continues to step S33.

Step S33: Controlling circuit 431 instructs the dequantizing means 171 to conclude the dequantization, thus terminating all the processes.

FIG. 24 illustrates the breakdown of the processes for detecting an end of a block by end-of-block detecting circuit 433.

Upon receiving an instruction from controlling circuit 431, end-of-block detecting circuit 433 starts its operation from step S41.

Step S41: Controlling circuit 431 instructs end-of-block detecting circuit 433 to initialize an intra-block address "ADR" to zero (0). The process continues to step S43.

Step S42: Controlling circuit 431 instructs end-of-block detecting circuit 433 to receive the value "RUN" of a current run decoded from a run code by LUT 414. The process proceeds to step S43.

Step S43: Controlling circuit 431 instructs end-of-block detecting circuit 433 to judge whether or not the inputted run is $R_{eob}$. When the judgment is affirmative [Y], the process skips to step S46. When the judgment is negative [N], the process continues to step S44.

Step S44: Controlling circuit 431 instructs end-of-block detecting circuit 433 to increase the value of the intra-block address "ADR" by one (1) and the value "RUN" of current run. The process proceeds to step S45.

Step S45: Controlling circuit 431 instructs end-of-block detecting circuit 433 to judge whether or not the intra-block address "ADR" has reached the end-of-block address. When the judgment is affirmative [Y], the process goes onto step S46. When the judgment is negative [N], the process reverts to step S42.

Step S46: End-of-block detecting circuit 433 notifies controlling circuit 431 of the detection of the last run and the completion of the processing for a block, thus terminating all the processes.

A processor can pipeline the sequential execution of respective steps in the operational flows shown in FIGS. 17 and 18 controlled by controlling circuit 351 or those shown in FIGS. 22 and 23 controlled by controlling circuit 431.

Thus, after a block of image data are reconstructed, controlling circuit 431 in timing controller 430 instructs a decoder 410 to initiate a decoding process. This causes the decoder 410 to start the process for decoding the next block of code data.

By repeating the above processes for respective blocks, all the image data for the entire image are reconstructed.

Further, by providing quantized coefficient memory 421 with a storage capacity for data pairs of two (2) blocks, this invention can configure the dequantizing means 171 to dequantize the data pairs of the preceding block stored in quantized coefficient memory 421 in parallel with the processes for decoding a block by the searching circuit 412 and LUTs 413 and 414.

This enables the time necessary for decoding and dequantizing DCT coefficients for a block to be further shortened.

As described above, an image data compressing apparatus set forth in this invention selects significant coefficients and counts insignificant coefficients independently, thereby reducing the time necessary for these processes. By pairing a significant coefficient with an insignificant coefficient succession length, it eliminates idle time in standing by for the coding process, thereby expediting the coding process and shortening the time necessary for image data compression.

Also, by having the coefficient converting means operate parallelly with the succession length converting means, this invention speeds up the coding process, even when a significant coefficient and an insignificant coefficient succession length are coded in line with the draft specification for standardization.

Besides, this invention enables a simple circuit configuration to code a coefficient matrix by separating the quantizing circuit module for creating quantized coefficients from a coefficient matrix from the coding circuit module for coding the serial quantized coefficients, thereby simplifying circuit controls and reducing the work necessary e.g. for a circuit examination. Also, since the quantizing circuit module can be configured to operate independently of the coding circuit module, it becomes possible to execute the quantizing process and the coding process faster than with the conventional processing of performing both processes in a series, thereby realizing a faster image data compressing apparatus.

In addition, this invention enables a code indicating an end of a block to be outputted according to the above described draft specification for standardization by having the coding circuit module judge whether or not the last quantized coefficient is an insignificant coefficient, in accordance with the type of termination signal included in the serial quantized coefficients.

An image data reconstructing apparatus set forth in this invention shortens the time necessary for inverse transformation by inversely transforming a coefficient code independently from a succession length code. By pairing a significant coefficient and an insignificant coefficient succession length, the image data reconstructing apparatus eliminates the idle time during dequantization for it to be expedited, thereby further cutting the time necessary for reconstructing image data.

What is claimed is:

1. An image data compressing apparatus comprising:
   orthogonally transforming means for obtaining a coefficient matrix comprising N rows and N columns of transform coefficients by two-dimensionally orthogonally transforming continuous-tone image data in block units each having N×N picture elements;
   quantizing means for quantizing respective elements of said coefficient matrix obtained by said orthogonally transforming means by corresponding quantization thresholds and for outputting quantized coefficients, being the results of quantizing respective elements of said coefficient matrix, in a predetermined sequence;
   signal producing means for converting a series of said quantized coefficients outputted from said quantized means into serial quantized coefficients comprising significant coefficients having non-zero values each paired with the corresponding one of insignificant coefficient succession lengths indicating the numbers of successive insignificant coefficients having the zero value, and for outputting said serial quantized coefficients by attaching a termination signal to the tail end of said serial quantized coefficients when a block of said quantized coefficients have been inputted from said quantizing means; and
   coding means for outputting codes respectively corresponding to said significant coefficients each paired with said corresponding one of said insignificant coefficient succession lengths included in said serial quantized coefficients outputted from said signal producing means.

2. An image data compressing apparatus comprising:

orthogonally transforming means for obtaining a coefficient matrix comprising N rows and N columns of transform coefficients by two-dimensionally orthogonally transforming continuous-tone image data in block units each having N×N picture elements;

quantizing means for quantizing respective elements of said coefficient matrix obtained by said orthogonally transforming means by corresponding quantization thresholds and for outputting quantized coefficients, being the results of quantizing respective elements of said coefficient matrix, in a predetermined sequence;

selecting means for sequentially receiving said quantizing coefficients obtained by said quantizing means, for selecting significant coefficients having non-zero values from among said quantized coefficients, and for sequentially outputting said significant coefficients;

counting mans for sequentially receiving said quantized coefficients, for counting the number of successive inputs of insignificant coefficients having the zero value, and for outputting counting results as insignificant coefficient succession lengths upon each receipt of the corresponding one of said significant coefficients;

first storing means for sequentially storing data pairs, each of said data pairs comprising one of said significant coefficients obtained by said selecting means and the corresponding one of said insignificant coefficient succession lengths obtained by said counting means; and coding means for outputting codes respectively corresponding to said data pairs read out from said first storing means, each of said data pairs comprising one of said significant coefficients and said corresponding one of said insignificant coefficient succession lengths.

3. The image data compressing apparatus according to claim 2, wherein:

said selecting means operates in parallel with said counting means.

4. The image data compressing apparatus according to claim 2, wherein said coding means comprises:

coefficient converting means for converting parts corresponding to said significant coefficients of said data pairs stored in said first storing means into appropriate coefficient codes;

succession length converting means for converting parts corresponding to said insignificant coefficient succession lengths of said data pairs into appropriate succession length codes; and code generating means for generating a code corresponding to a data pair comprising a coefficient code obtained by said coefficient converting means and a succession length code obtained by said succession length converting means.

5. The image data compressing apparatus according to claim 2, wherein:

said first storing means has a memory capacity for storing said data paris corresponding to two blocks of said image data; and said coding means codes said stored data pairs in parallel with operations for generating and storing data paris by said quantizing means, selecting means and said counting means.

6. An image data compressing apparatus comprising:

orthogonally transforming means for obtaining a coefficient matrix comprising N rows and N columns of transform coefficients by two-dimensionally orthogonally transforming continuous-tone image data in block units each having N×N picture elements;

quantizing mans for quantizing respective elements of said coefficient matrix obtained by said orthogonally transforming means by corresponding quantization thresholds and for outputting quantized coefficients, being the results of quantizing respective elements of said coefficient matrix, in a predetermined sequence;

converting means for converting a series of quantized coefficients outputted from said quantizing means into serial quantized coefficients comprising significant coefficients having non-zero values each paired with the corresponding one of insignificant coefficient succession lengths indicating the numbers of successive insignificant coefficients having the zero value;

generating means for generating a predetermined termination signal;

attaching means for outputting serial quantized coefficients obtained by said converting means by attaching said predetermined termination signal generated by said generating means to the tail end of said serial quantized coefficients;

coding means for outputting codes respectively corresponding to said significant coefficients each paired with said corresponding one of said insignificant coefficient succession lengths included in said serial quantized coefficients outputting from said attaching means; and instructing means for instructing said coding means of a termination of a process for coding a block upon detecting said termination signal during a receipt of said serial quantized coefficients.

7. The image data compressing apparatus according to claim 6, wherein:

said generating means comprises:

first generating means for generating a predetermined first termination signal;

second generating means for generating a different second predetermined termination signal; and selecting means for selectively outputting, as said predetermined termination signal, either said first termination signal or said second termination signal, depending on whether or not a quantized coefficient outputting last from said quantizing means is an insignificant coefficient, and said instructing means comprises a judging means for judging whether said predetermined termination signal is said first termination signal or said second termination signal, and for instructing said coding means of a termination of coding for a block according to the judging result of said judging means.

8. An image data reconstructing apparatus for reconstructing image data based on input codes created by coding coefficient codes and succession length codes converted from significant coefficients and insignificant coefficient succession lengths produced from among quantized coefficients obtained by quantizing the result of two-dimensionally orthogonally transforming image data in block units each comprising N×N picture elements, said image data reconstructing apparatus comprising:

decoding means for decoding said input codes to said coefficient codes and said succession length codes;

coefficient code reverting means for reverting said coefficient codes obtained by said decoding means into corresponding significant coefficients;

succession length code reverting means for reverting said succession length codes obtained by said decoding means into corresponding insignificant coefficient succession lengths;

second storing means for storing, as a data pair, a pair composed of a significant coefficient obtained by said coefficient code reverting means and an insignificant coefficient succession length obtained by said succession length code reverting means;

dequantizing means for obtaining appropriate transform coefficients by dequantizing said significant coefficients based on said significant coefficients and said insignificant coefficient succession lengths expressed as said data pairs read out from said second storing means and for outputting said transform coefficients as corresponding elements of a coefficient matrix having N rows and N columns; and inverse orthogonally transforming means for two-dimensionally inverse-orthogonally transforming said coefficient matrix obtained by said dequantizing means and for outputting the transforming result as image data.

9. The image data reconstructing apparatus according to claim 8, wherein:

said coefficient code reverting means operates in parallel with said succession length code reverting means.

10. The image data reconstructing apparatus according to claim 8, wherein:

said second storing means has a memory capacity for storing said data pairs for two blocks of said image data; and said dequantizing means dequantizes said stored data pair in parallel with operations for generating and storing data pairs by said decoding means, said coefficient code reverting means and said succession length code reverting means.

* * * * *

UNITED STATES PATENT AND TRADEMARK OFFICE
CERTIFICATE OF CORRECTION

PATENT NO. : 5,303,058

DATED : April 12, 1994

INVENTOR(S) : Masahiro Fukuda et al.

It is certified that error appears in the above-indentified patent and that said Letters Patent is hereby corrected as shown below:

Col. 6, line 68, delete "NXN" and substitute --NxN--.

Col. 13, line 26, delete "O" and substitute --Ⓐ--.

Col. 15, line 18, delete "73" and substitute --373--.

Col. 18, line 18, after "end" insert --,--.

Col. 19, line 66, after "state" insert --.--.

Col. 20, line 30, delete "car" and substitute --can--.

Col. 21, line 66, delete first occurrence of "B" and substitute --Ⓑ--.

Col. 22, line 42, delete "hit hereto" and substitute --hitherto--; and line 61, delete "LA" and substitute --DA--.

Col. 25, line 26, delete "mans" and substitute --means--.

UNITED STATES PATENT AND TRADEMARK OFFICE
CERTIFICATE OF CORRECTION

PATENT NO. : 5,303,058

DATED : April 12, 1994

INVENTOR(S) : Masahiro Fukuda et al

It is certified that error appears in the above-indentified patent and that said Letters Patent is hereby corrected as shown below:

Col. 26, line 12, delete "mans" and substitute —means—.

Signed and Sealed this

Thirteenth Day of September, 1994

Attest:

BRUCE LEHMAN

Attesting Officer     Commissioner of Patents and Trademarks